US010840719B2

(12) United States Patent
Matsumoto et al.

(10) Patent No.: US 10,840,719 B2
(45) Date of Patent: Nov. 17, 2020

(54) MAGAZINE-TYPE CHARGING DEVICE

(71) Applicant: HONDA MOTOR CO., LTD., Tokyo (JP)

(72) Inventors: Takashi Matsumoto, Wako (JP); Daijiro Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/648,906

(22) PCT Filed: Sep. 7, 2018

(86) PCT No.: PCT/JP2018/033124
§ 371 (c)(1),
(2) Date: Mar. 19, 2020

(87) PCT Pub. No.: WO2019/065154
PCT Pub. Date: Apr. 4, 2019

(65) Prior Publication Data
US 2020/0227928 A1    Jul. 16, 2020

(30) Foreign Application Priority Data

Sep. 29, 2017    (JP) .................................. 2017-192209
Apr. 27, 2018    (JP) .................................. 2018-086346

(51) Int. Cl.
*H02J 7/00* (2006.01)
*H01M 10/44* (2006.01)
*H01M 10/46* (2006.01)

(52) U.S. Cl.
CPC ......... *H02J 7/0045* (2013.01); *H01M 10/441* (2013.01); *H01M 10/46* (2013.01); *H02J 7/00032* (2020.01)

(58) Field of Classification Search
CPC .... H02J 7/0045; H02J 7/00032; H02J 7/0027; H01M 10/46; H01M 10/441
USPC .................................. 320/107, 112–113, 115
See application file for complete search history.

(56) References Cited

U.S. PATENT DOCUMENTS

| | | | |
|---|---|---|---|
| 2012/0013291 A1* | 1/2012 | Lahti | H02J 7/0044 320/107 |
| 2013/0030581 A1 | 1/2013 | Luke et al. | |
| 2015/0064514 A1 | 3/2015 | Wu et al. | |

FOREIGN PATENT DOCUMENTS

| | | |
|---|---|---|
| JP | 60-165047 | 8/1985 |
| JP | 2000-182145 | 6/2000 |
| JP | 2000-341868 | 12/2000 |
| JP | 2006-134755 | 5/2006 |
| JP | 2008-043078 | 2/2008 |

(Continued)

OTHER PUBLICATIONS

International Search Report and Written Opinion for International Application No. PCT/JP2018/033124 dated Oct. 2, 2018, 12pages.

*Primary Examiner* — Zixuan Zhou
(74) *Attorney, Agent, or Firm* — Amin, Turocy & Watson, LLP

(57) ABSTRACT

A charging base has a charging tray in which a connector hole is formed. When the position of the connector hole corresponds to the position of a device-side charging connector installed below the charging tray, the device-side charging connector is raised due to the action of a raising/lowering mechanism.

19 Claims, 25 Drawing Sheets

(56) References Cited

FOREIGN PATENT DOCUMENTS

| JP | 2014-527689 | 10/2014 |
| JP | 2016-534518 | 11/2016 |

* cited by examiner

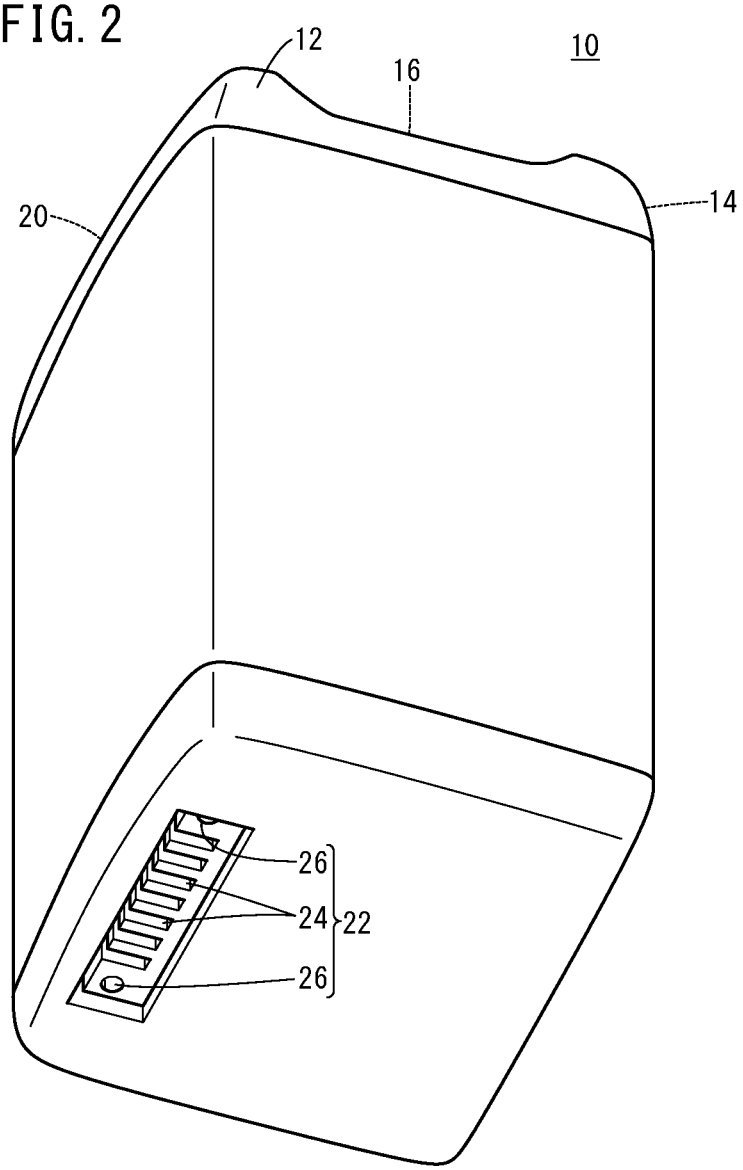

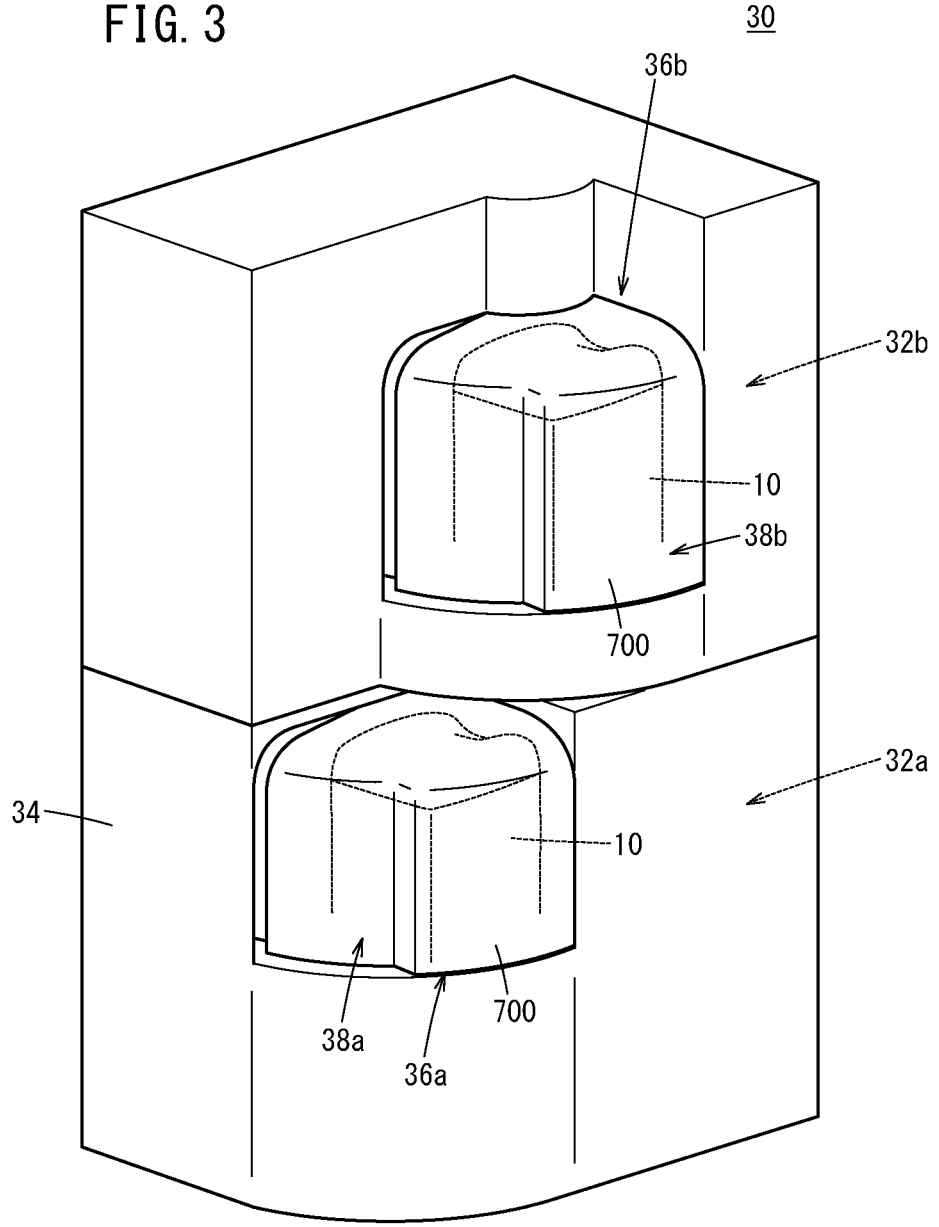

MAGAZINE-TYPE CHARGING DEVICE

TECHNICAL FIELD

The present invention relates to a magazine-type charging device in which, when a battery that needs recharging, e.g. after use or when insufficiently charged, is placed on a charging stand in a given position, then the charging stand is displaced and accommodated in a casing and a recharged battery is newly exposed so that it can be taken out from the casing.

BACKGROUND ART

Batteries are now widely used because they have advantages that they provide clean driving sources without exhaust emissions and the like, they can be reused by recharging after discharging, they can be easily recharged from commercial power supply, and so on. For example, Japanese Laid-Open Patent Publication No. 2016-534518 (PCT) proposes a battery that can be used as a driving source for an electric motor scooter (which is referred to as "portable electric energy storage device" in Japanese Laid-Open Patent Publication No. 2016-534518).

This battery comprises a housing composed of a sleeve-like outer shell having a cross section substantially in the shape of a square and top and bottom ends opened, and a cover (top case) and a base (bottom case) positioned respectively at the top and bottom ends of the outer shell. The housing accommodates multiple separate battery core packs. Furthermore, the cover has a handle. It is said that the user can hold the handle to put the battery into and take it out from a compartment provided under the seat of the electric motor scooter.

It is preferred that a charging device for recharging batteries can recharge multiple batteries at the same time. This is because it is then possible to store many batteries that have been fully recharged so that they can be used when necessary. Charging devices of this type include that disclosed in Japanese Laid-Open Patent Publication No. 2014-527689 (PCT). This charging device includes multiple containers for individually accommodating batteries (portable electric energy storage devices) and therefore can collect, recharge, and distribute batteries.

Furthermore, Japanese Laid-Open Patent Publication No. 2000-182145 discloses a battery supply device that supplies recharged batteries for electric assisted bicycles. This battery supply device comprises a chamber having a door attached in the center of its front face through which batteries are supplied and returned, and the chamber comprises battery supply openings for supplying and returning batteries. The housing of the battery supply device accommodates an upper battery supply mechanism and a lower battery supply mechanism. The two battery supply mechanisms have the same structure, each including a rotary table and eight slots provided around the circumference of the rotary table to hold batteries. The slots are separated from each other at an angle of 45° with respect to the rotation center of the rotary table. Each slot is inclinable and is joined in the inclined position to the battery supply opening for supplying or returning batteries. The battery supply openings are located above a charger (charging device) and battery power-supply section, i.e., at relatively high positions in the housing.

SUMMARY OF INVENTION

Batteries and the like used as the driving source for electric two-wheeled vehicles etc. are often large-sized so as to ensure large capacity, and are often formed substantially in the shape of a rectangular parallelepiped. It is preferable to place such large-sized rectangular batteries in a charging device in a vertical upright posture. Upright posture makes it easier to store the battery in the charging device by gravity.

In this case, a battery-side charging connector is provided at the bottom surface of the battery. Accordingly, the user cannot sight the battery-side charging connector when putting the battery into the charging device. Hence, if the user places the battery in a wrong direction (posture) in the charging device, the battery cannot be charged since the positions of the battery-side charging connector and device-side charging connector do not coincide. Furthermore, this may damage the male, device-side charging connector.

A main object of the present invention is to provide a magazine-type charging device that is capable of avoiding damage to the device-side charging connector even if a user puts in a battery in a wrong posture.

An embodiment of the present invention provides a magazine-type charging device which allows a battery that requires charging to be stored in a storage position and a recharged battery to be moved to the storage position and extracted from the storage position. The magazine-type charging device includes:

a rotary table;

a driving device for turning the rotary table;

a charging stand that is provided on the rotary table and on which the battery is placed respectively; and a device-side charging connector that is provided respectively in the charging stand and with which a battery-side connector of the battery is engaged, and the charging stand includes:

a charging tray having formed therein a connector hole through which the device-side charging connector is passed; and a raising and lowering mechanism for displacing the device-side charging connector in a vertical direction.

As described above, according to the present invention, the device-side charging connector can be displaced in a vertical direction. The device-side charging connector is in the lowered position before the battery is placed on the charging tray. The bottom surface of the battery therefore does not abut on the device-side charging connector even if the user places the battery on the charging stand in a wrong posture. This avoids damage to the device-side charging connector.

The device-side charging connector may be raised under an action of the raising and lowering mechanism only when a position of the connector hole formed in the charging tray coincides with a position of the device-side charging connector. This further effectively avoids damage to the device-side charging connector.

The charging stand may include a sliding mechanism for sliding the charging tray frontward and backward and a lock mechanism for positioning and fixing the charging tray. The lock mechanism positions and fixes the charging tray when the charging tray slides and the position of the connector hole coincides with the position of the device-side charging connector. On the other hand, the lock mechanism releases the positioning and fixing of the charging tray as the device-side charging connector is lowered.

The lock mechanism positions and fixes (locks) the charging tray when the device-side charging connector is raised to pass through the connector hole. This prevents the charging tray from moving while the battery is being charged. Further, the device-side charging connector is kept raised and engaged with the battery-side connector. That is, this avoids release of the engagement of the device-side charging connector and the battery-side connector during charging operation.

The lock mechanism automatically releases the lock of the charging tray as the device-side charging connector is lowered. The user therefore does not have to perform a releasing operation. It is thus easy to slide the charging tray and take up the battery.

Furthermore, it is preferred that the charging stand includes an elastic member for sliding the charging tray frontward when the positioning and fixing (lock) of the charging tray is released. The charging tray automatically slides toward the user side (frontward) under the action of the elastic member as the lock is released. The user does not have to take the trouble of pulling the charging tray to him or her.

According to the present invention, the device-side charging connector provided in the charging stand of the magazine-type charging device is provided with the raising and lowering mechanism so that the device-side charging connector can be raised or lowered under the action of the raising and lowering mechanism. Hence, the device-side charging connector can be at the lowered position before the battery is placed on the charging tray. Accordingly, the bottom surface of the battery does not abut on the device-side charging connector even if the user places the battery on the charging stand in a wrong posture, which avoids damage to the device-side charging connector.

BRIEF DESCRIPTION OF DRAWINGS

FIG. 2 is a bottom-side perspective view of the battery shown in FIGS. 1A and 1B;

FIG. 3 is a schematic overall perspective view of a magazine-type charging device according to an embodiment of the present invention;

DESCRIPTION OF EMBODIMENTS

Figure 1A:
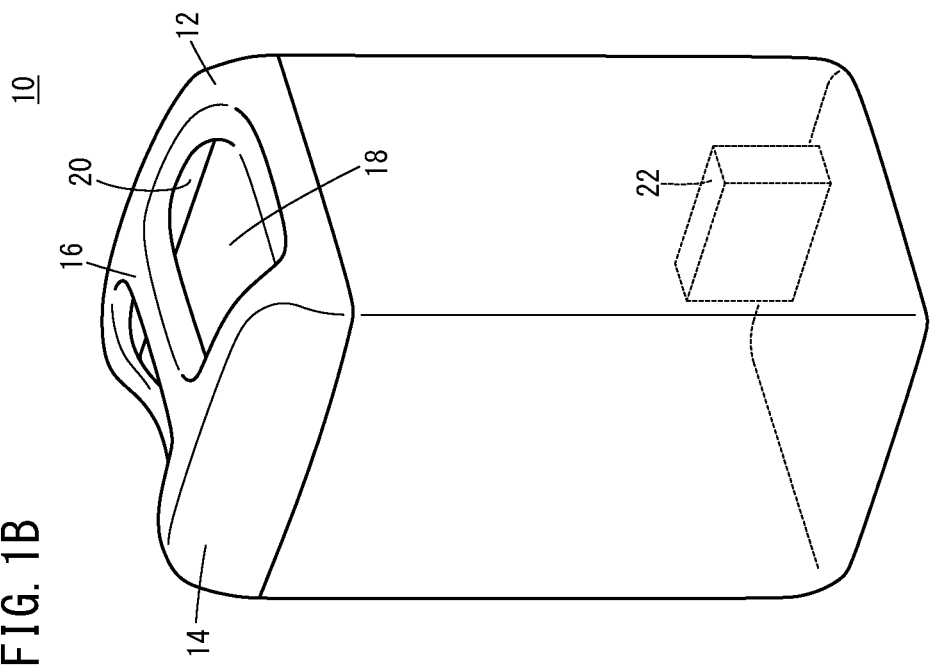
FIG. 1A is a schematic overall perspective view of a battery seen from one direction.

Now, the magazine-type charging device according to the present invention will be described in detail referring to the accompanying drawings in conjunction with preferred embodiments.

First, a battery 10 illustrated in FIGS. 1A and 1B will be described. The battery 10 is substantially in the shape of an elongated, rectangular parallelepiped and used as a driving force supply source for an electric motorbike EB (see FIG. 21), for example. The top surface of the battery 10 has an arch portion 12 (second handle) having both its ends in the longitudinal direction bent to join the top surface to form an arch, and a tab-like projection 14 (projection) having its top edge curved in a circular arc shape, where the arch portion 12 and the tab-like projection 14 are disposed to face each other. A distance H2 between the top edge of the tab-like projection 14 and the bottom surface of the battery 10 is set to be larger than a distance H1 between the lower end of the arch portion 12 and the bottom surface of the battery 10. The projecting height of the tab-like projection 14 and the projecting height of the arch portion 12 are substantially equivalent.

A holding bar 16 (a first handle) extends across the top edge of the arch portion 12 and the top edge of the tab-like projection 14. That is, the holding bar 16 extends substantially orthogonal to the direction in which the arch portion 12 extends. Now, since the top edges of both of the arch portion 12 and the tab-like projection 14 project from the top surface of the battery 10, the holding bar 16 is separated away from the top surface of the battery 10. Accordingly, a holding clearance 18 forms between the holding bar 16 and the top surface of the battery 10. A user can hold the holding bar 16 by putting a hand (fingers) into the holding clearance 18.

An entry opening 20 opens between the arch portion 12 and the top surface of the battery 10. That is, the arch portion 12 also functions as an entry opening forming portion that forms the entry opening 20. A judging projection 108 (see FIGS. 6 and 7), which will be described later, enters the entry opening 20. The entry opening 20 is contiguous with the holding clearance 18. On the other hand, the tab-like projection 14 has no opening. That is, the part between the tab-like projection 14 and the top surface of the battery 10 is closed.

Figure 1B:
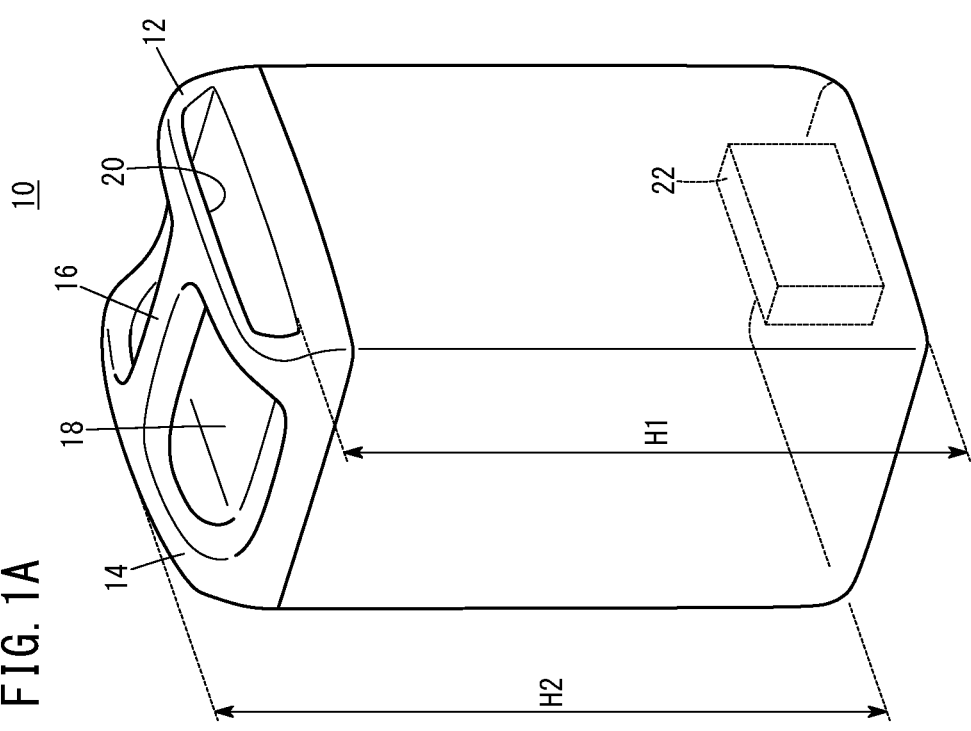
FIG. 1B is a schematic overall perspective view of the battery seen from another direction.

As shown in FIGS. 1A, 1B and 2, the battery 10 includes a battery-side charging and discharging connector 22, as a battery-side connector, positioned at the bottom surface thereof on the side where the arch portion 12 (entry opening) 20 is disposed. The battery-side charging and discharging connector 22 engages with a device-side charging connector 112 that will be described later (see FIG. 7), whereby the battery 10 is electrically connected to a lower-stage charger 52a or an upper-stage charger 52b (see FIG. 4) through the two connectors 22, 112 and is charged. The battery-side charging and discharging connector 22 includes a plurality of plate-like terminal entry recesses 24 and two rod entry recesses 26 at both ends of the plate-like terminal entry recesses 24 (see FIG. 2).

Figure 8:
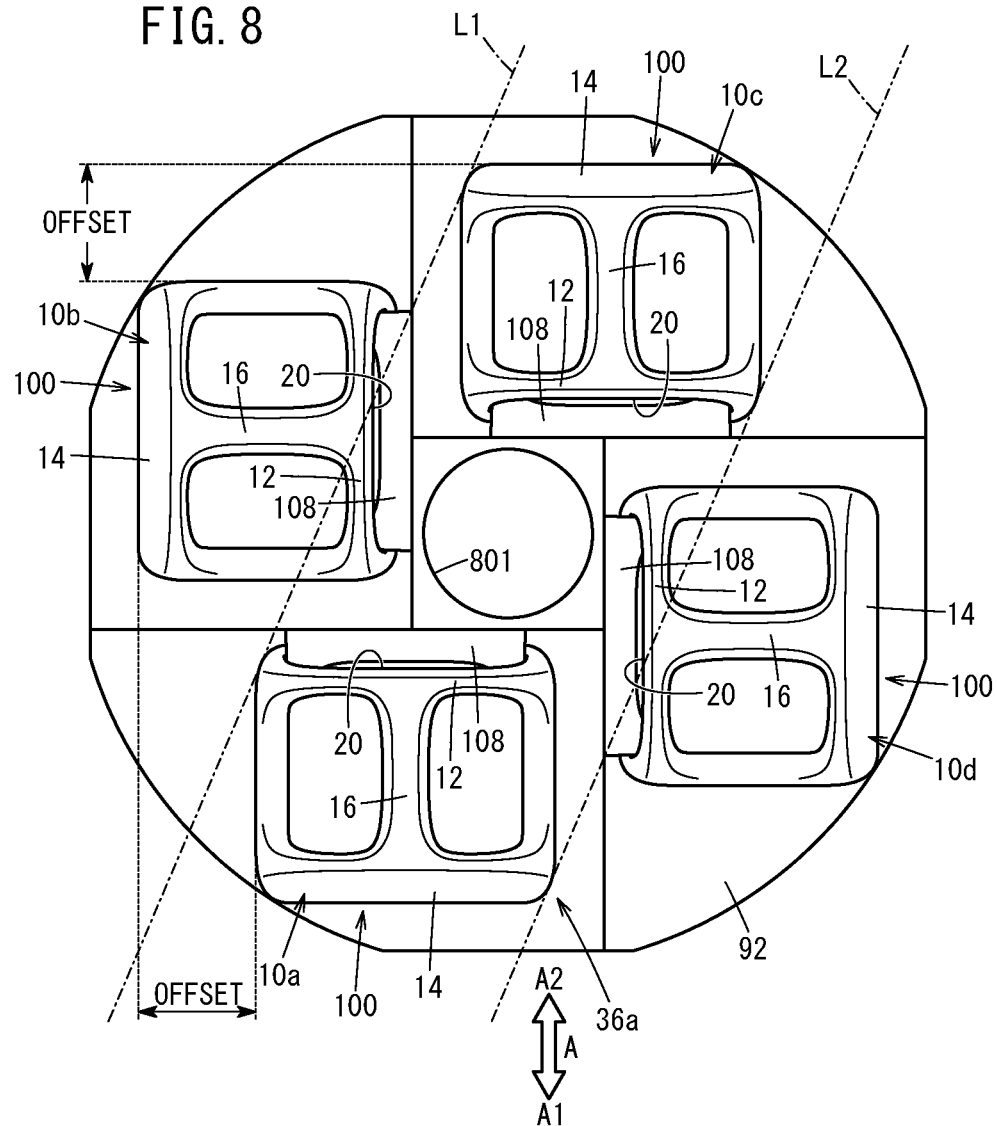
FIG. 8 is a schematic plan view illustrating how batteries are arranged on a lower-stage rotary table of the first unit magazine.

When seen in plan view, the shape of the battery 10 structured this way is substantially a square or rectangle (see FIG. 8 especially). In this case, the space on a lower-stage rotary table 54a can be utilized more efficiently as compared to cases where the battery 10 has other shape in plan view.

Next, the magazine-type charging device will be described. FIG. 3 is a schematic overall perspective view of a magazine-type charging device 30. The magazine-type charging device 30 includes two unit magazines, i.e. a first unit magazine 32a and a second unit magazine 32b, which are arranged (stacked) vertically, where the first unit magazine 32a and the second unit magazine 32b are accommodated in one casing 34. Each of the first unit magazine 32a and the second unit magazine 32b can store four batteries 10. A first opening and closing shutter 38a and a second opening and closing shutter 38b, as opening and closing shutters, are provided in a first storage position 36a in which a battery 10 is stored in the first unit magazine 32a and a second storage position 36b in which a battery 10 is stored in the second unit magazine 32b. As can been seen from FIG. 3, the first storage position 36a and the second storage position 36b are disposed in an offset manner in plan view. The first storage position 36a and the second storage position 36b also function as an extraction position from which the battery 10 can be taken out, which will be described later.

The casing 34 further includes a receiver (communication means) not shown. The receiver receives a signal sent from a smartphone or an RF key that the user holds, or from an electric motorbike EB (see FIG. 21). A control device 60 (see FIG. 4) provided in the casing 34 recognizes reception of the signal at the receiver and provides control after that. As will be described later, the control device 60 constitutes placement detecting means for detecting placement of the battery 10 on a charging stand 100 and extraction detecting means for detecting extraction of the battery 10 from the charging stand 100.

Figure 4:
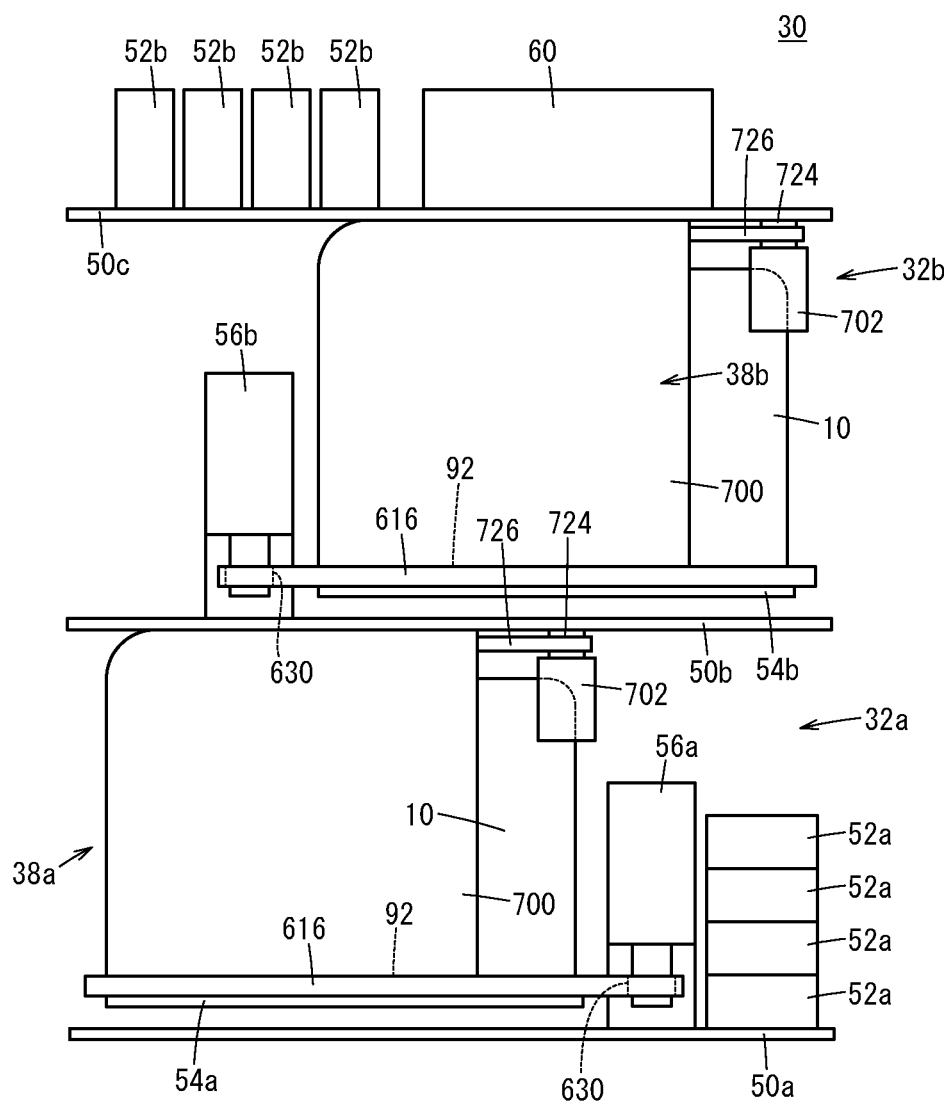
FIG. 4 is a schematic front view showing a first unit magazine and a second unit magazine with the casing removed.

FIG. 4 schematically illustrates the magazine-type charging device 30 with the casing 34 removed. Lower-stage chargers 52a for charging batteries 10 placed in the first unit magazine 32a, and a lower-stage driving motor 56a that forms a driving device for turning the lower-stage rotary table 54a, are disposed close to each other on a lower-side base plate 50a of the first unit magazine 32a. On the other hand, on an inside base plate 50b of the second unit magazine 32b, an upper-stage driving motor 56b is provided to form a driving device for turning an upper-stage rotary table 54b. The first unit magazine 32a and the second unit magazine 32b are divided by the inside base plate 50b.

As can be seen from FIGS. 3 and 4, the first unit magazine 32a and the second unit magazine 32b are stacked in a vertical direction and the lower-stage rotary table 54a and the upper-stage rotary table 54b are offset from each other. The lower-stage chargers 52a and the lower-stage driving motor 56a, and the upper-stage driving motor 56b are disposed in the space produced by the offset arrangement. This reduces the area taken up by one magazine-type charging device 30.

Furthermore, the lower-stage driving motor 56a is disposed at the side of the lower-stage rotary table 54a and the upper-stage driving motor 56b is disposed at the side of the upper-stage rotary table 54b. Accordingly, the height positions of the lower-stage rotary table 54a and the upper-stage rotary table 54b are not restricted by the heights of the lower-stage driving motor 56a and the upper-stage driving motor 56b. In other words, the lower-stage rotary table 54a and the upper-stage rotary table 54b can be disposed at a height such that batteries 10 can be inserted and extracted easily.

An upper-side base plate 50c is disposed over the second unit magazine 32b, and upper-stage chargers 52b for charging batteries 10 placed in the second unit magazine 32b and the above-described control device 60 are mounted on the upper-side base plate 50c.

Figure 5:
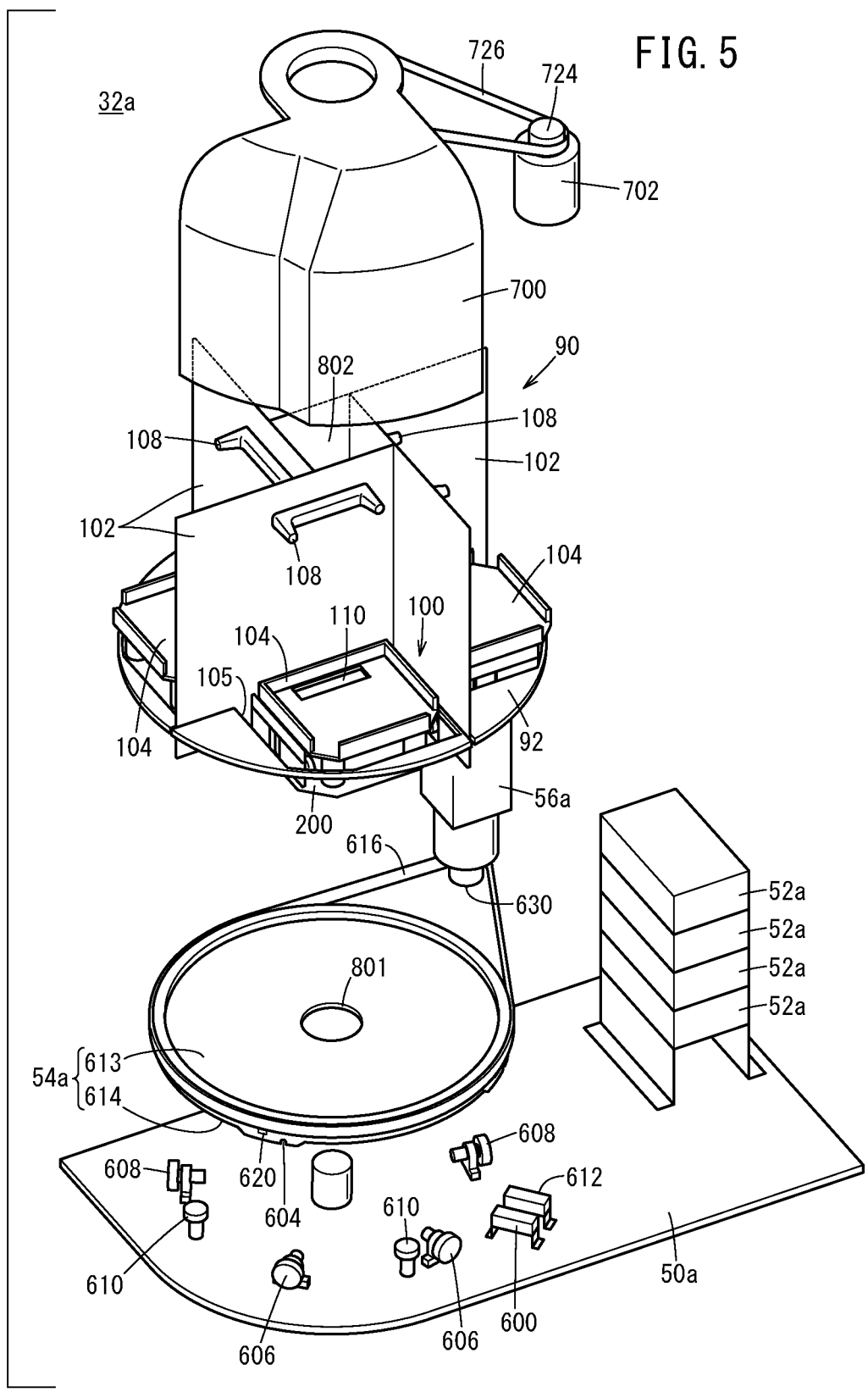
FIG. 5 is a schematic exploded perspective view of the first unit magazine.

Next, the first unit magazine 32a will be described in detail. FIG. 5 is a schematic exploded perspective of the first unit magazine 32a. In the first unit magazine 32a, as the lower-stage rotary table 54a performs index rotation on the lower-side base plate 50a, a charging section 90 accommodating batteries 10 performs index rotation integrally. The above-mentioned first opening and closing shutter 38a covers part of the charging section 90 in such a manner that the part of the charging section 90 can be exposed in the first storage position 36a (see FIG. 3). In other words, the part of the charging section 90 located in the first storage position 36a is exposed out of the casing 34 when the first opening and closing shutter 38a opens.

Figure 6:
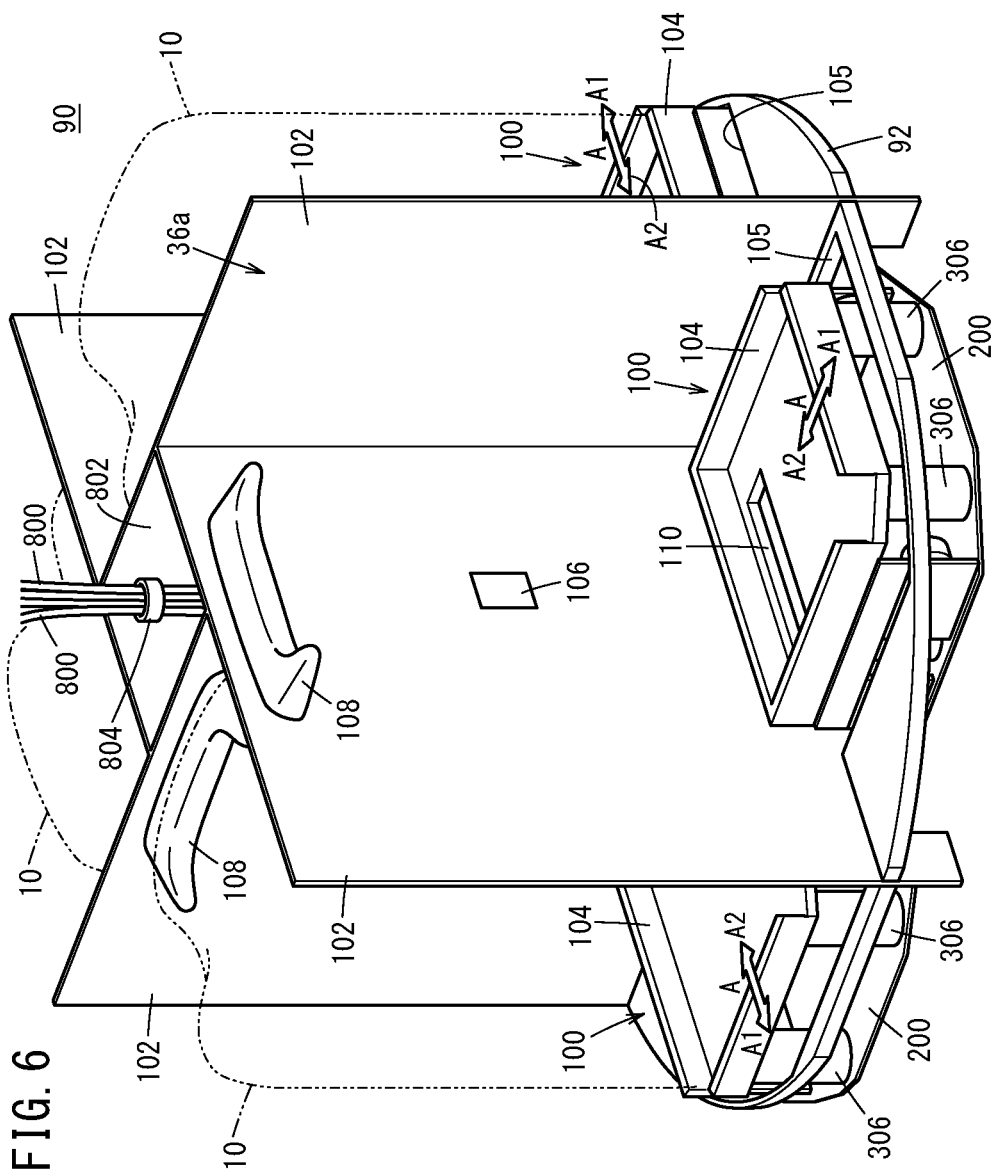
FIG. 6 is a schematic perspective view showing the main parts of the charging section of the first unit magazine, where a charging tray is positioned somewhat frontward.
Figure 7:
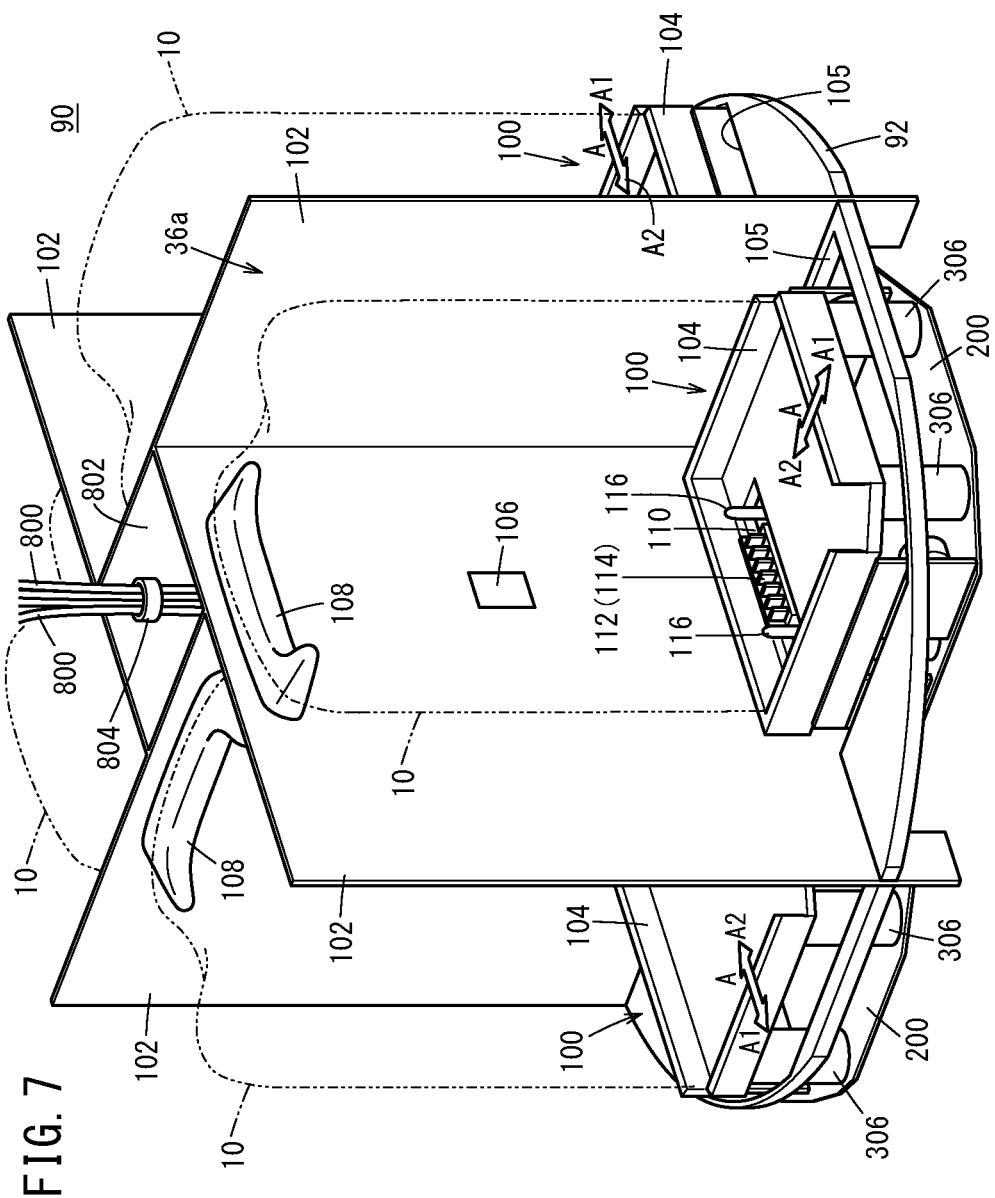
FIG. 7 is a schematic perspective view showing the main parts where the charging tray of FIG. 6 is positioned in the backmost position and a device-side charging connector is inserted in a connector hole.

The charging section 90 will be described. FIGS. 6 and 7 are schematic perspectives showing the main parts of the charging section 90 constituting the first unit magazine 32a. The charging section 90 includes a rotary disk 92 that turns integrally with the lower-stage rotary table 54a, and four charging stands 100 provided in the rotary disk 92. The multiple charging stands 100 are partitioned by backboards 102, and each charging stand 100 is provided with a charging tray 104. Part of each charging stand 100 is inserted in an insertion hole 105 formed in the rotary disk 92, and the charging stands 100 turn integrally with the lower-stage rotary table 54a and the rotary disk 92 (see FIG. 5).

Each backboard 102 is provided with a proximity sensor 106 and the substantially U-shaped judging projection 108 is formed to project above the proximity sensor 106. Part of the backboard 102 projects from the lower surface of the rotary disk 92 and is joined to the lower-stage rotary table 54a. That is, the backboard 102 is supported by the lower-stage rotary table 54a in an upright posture. Hence, the backboards 102 also turn integrally with the lower-stage rotary table 54a and the rotary disk 92.

An inner edge of each backboard 102 is located at a position offset from the edge of another backboard 102. Thus, the four backboards 102 are combined together to form a hollow portion 802 in the shape of a quadrangular prism in the center thereof.

As shown in FIG. 8, one battery 10 can be placed on one charging stand 100. As shown in FIG. 8, in plan view, the four batteries 10 are somewhat offset from perfectly opposing positions. Now, in order to clearly distinguish the batteries 10, the four batteries 10 in FIG. 8 are indicated as first battery 10a, second battery 10b, third battery 10c, and fourth battery 10d, and then the first battery 10a and the third battery 10c face each other, and the second battery 10b and the fourth battery 10d face each other.

Further, when a left-hand imaginary line L1 touches left-hand corners of the mutually facing first battery 10a and third battery 10c and a right-hand imaginary line L2 touches right-hand corners thereof, then the left-hand imaginary line L1 crosses the second battery 10b. In the same say, the right-hand imaginary line L2 crosses the fourth battery 10d.

Further, the upper ends of the second battery 10b and the third battery 10c that are adjacent laterally are located at different positions and the left ends of the first battery 10a and the second battery 10b that are adjacent longitudinally are also located at different positions. Now, note that the directions above, "left", "right", and "upper", are directions that are defined when the user sees the charging section 90 in plan view, and they are not the right side, left side, and upper side of the batteries 10.

In this way, batteries 10 facing each other and batteries 10 next to each other are arranged on the charging stands 100 in the casing 34 in such a manner that they are offset from each other. Accordingly, as compared to cases where four batteries 10 are positioned at the corners of a square such that they perfectly face each other, it is possible to more efficiently utilize the space on the lower-stage rotary table 54a.

As can be seen from FIG. 8, adjacent batteries 10, i.e., the first battery 10a and second battery 10b, the second battery 10b and third battery 10c, the third battery 10c and fourth battery 10d, and the fourth battery 10d and first battery 10a, are arranged such that the holding bars 16 thereof extend in directions substantially orthogonal to each other.

Each of the charging trays 104 shown in FIGS. 6 and 7 can be slid in the directions indicated by arrow A, i.e. frontward and backward in front view (in direction A1 and direction A2). Hereinafter, the directions indicated by the arrow A in the following drawings correspond to the directions of the arrow A in FIGS. 6 and 7. Also, in correspondence with the directions in which the charging tray 104 slides, the side that separates away from the device-side charging connector 112 (the side of the direction A1) may be referred to as "frontward" and the side that approaches it (the side of the direction A2) as "backward". Further, in the description below, a "front end" indicates an end on the A1 side and a "rear end" indicates an end on the A2 side.

Each charging tray 104 is located in the frontmost position when no battery 10 is placed in the first storage position 36a.

FIG. 6 shows a charging tray 104 displaced somewhat frontward. Then, after a battery 10 is placed thereon, the charging tray 104 is slid backward (to A2 side). As shown in FIG. 7, as the charging tray 104 slides backward, the device-side charging connector 112 ascends to enter a connector hole 110 when the position of the connector hole 110 coincides with the position of the device-side charging connector 112.

Now, in each charging stand 100 other than that in the first storage position 36a, the charging tray 104 is located in the backmost position (at A2 side) and the device-side charging connector 112 is passed through the connector hole 110 with a battery 10 placed thereon. Thus, the charging trays 104 other than that in the first storage position 36a do not slide frontward.

Each charging stand 100 includes a support board 200 that faces the charging tray 104 through the insertion hole 105. That is, the support board 200 is disposed under the charging tray 104. The support board 200 is positioned and fixed on the upper surface of the lower-stage rotary table 54a (see FIG. 5).

Figure 9:
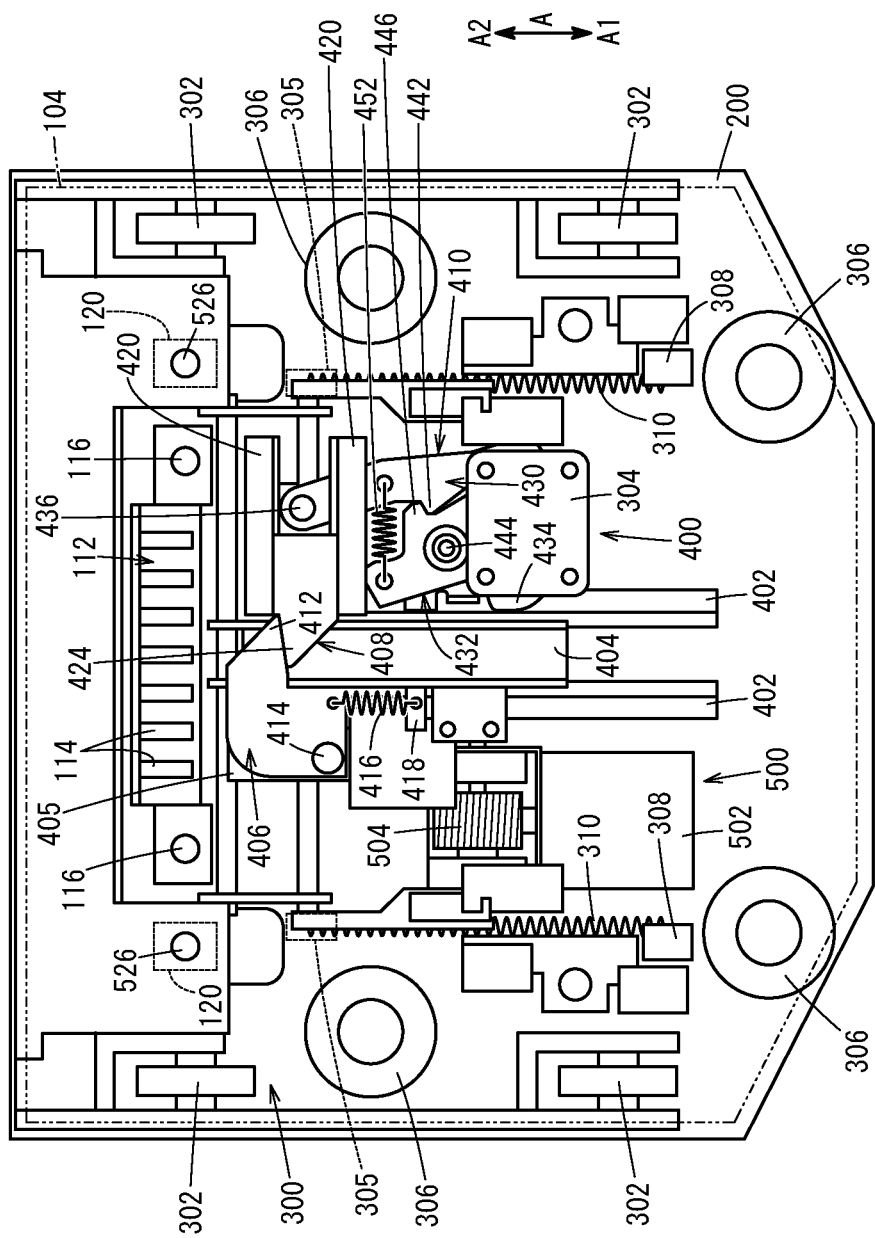
FIG. 9 is a schematic plan view showing a sliding mechanism, a lock mechanism, and a raising and lowering mechanism that are disposed under the lower-stage rotary table.

As shown in FIG. 9 in detail, the device-side charging connector 112 is mounted on the support board 200 in such a manner that the device-side charging connector 112 can be raised and lowered. The device-side charging connector 112 includes plate-like terminals 114 that enter into or separate from the plate-like terminal entry recesses 24, and two fitting rods 116 disposed at both ends of the plate-like terminals 114. The fitting rods 116 enter into or separate from the rod entry recesses 26.

Figure 13:
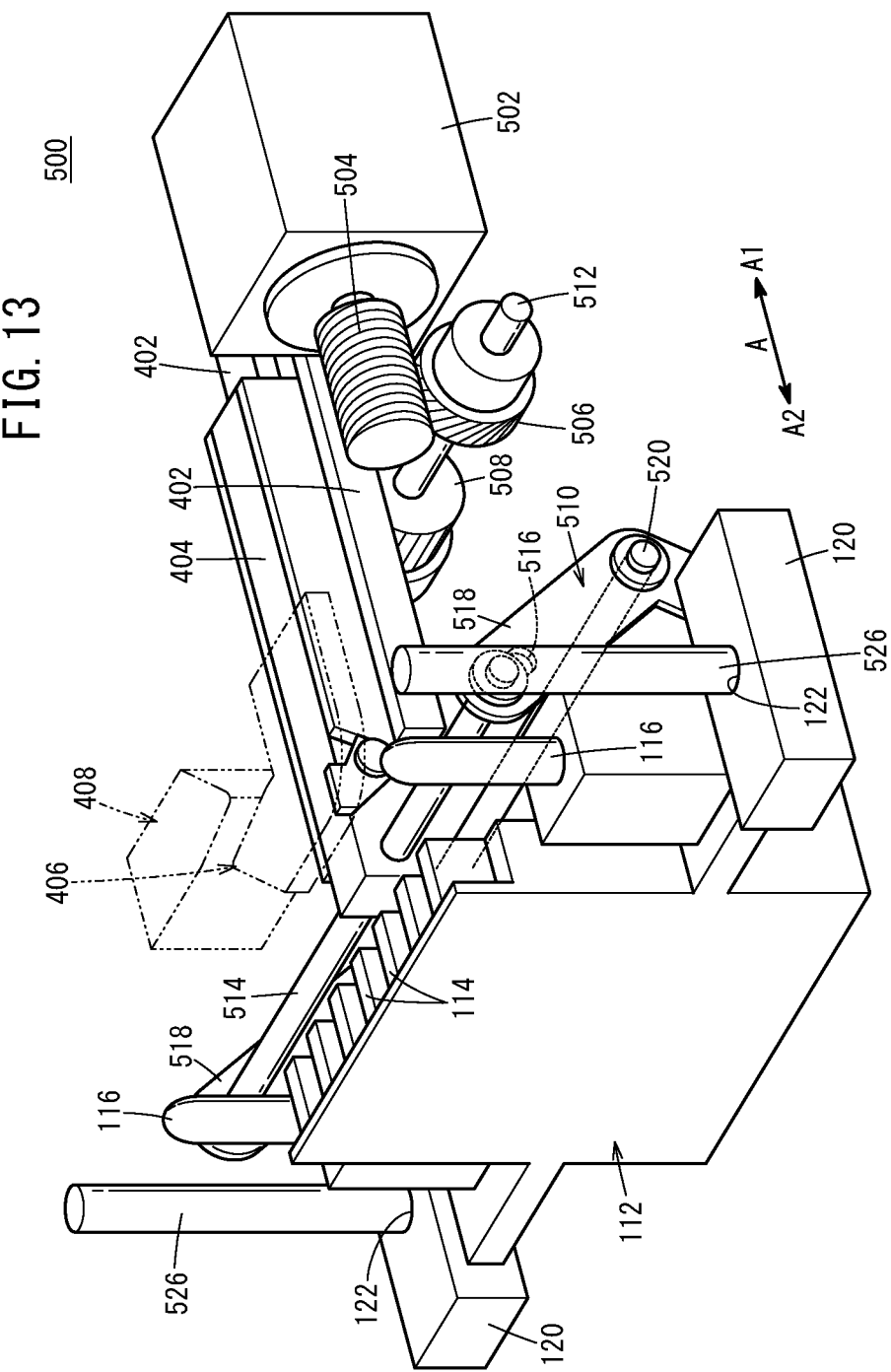
FIG. 13 is a schematic perspective view showing the main parts of the raising and lowering mechanism shown in FIG. 9.

The device-side charging connector 112 includes two guided portions 120 provided outside of the fitting rods 116 (see FIG. 13). Each guided portion 120 has a guide hole 122 formed therethrough in the vertical direction. A guide rod 526, which will be described later, is slidably inserted in the guide hole 122.

Provided on the support board 200 are a sliding mechanism 300 that enables the charging tray 104 to slide frontward and backward, a lock mechanism 400 that positions and fixes the charging tray 104 that has slid backward, and a raising and lowering mechanism 500 that raises and lowers the device-side charging connector 112.

The sliding mechanism 300 includes multiple retractable rollers 302 on which the charging tray 104 slides, a moved plate 304 joined to the back surface of the charging tray 104, and two attaching plates 305 provided on the back surface of the charging tray 104. The retractable rollers 302 are disposed on both sides of multiple impact-absorbing springs 306 erected on the support board 200.

The sliding mechanism 300 further includes spring fixing parts 308 erected on the support board 200. A tray discharge spring 310 (elastic member) is hung in a tensional manner between each spring fixing part 308 and attaching plate 305. That is, the front end of the tray discharge spring 310, which is located away from the device-side charging connector 112, is attached to the spring fixing part 308 that is positioned and fixed. On the other hand, its rear end closer to the device-side charging connector 112 is attached to the attaching plate 305 that is displaced together with the charging tray 104.

Figure 10:
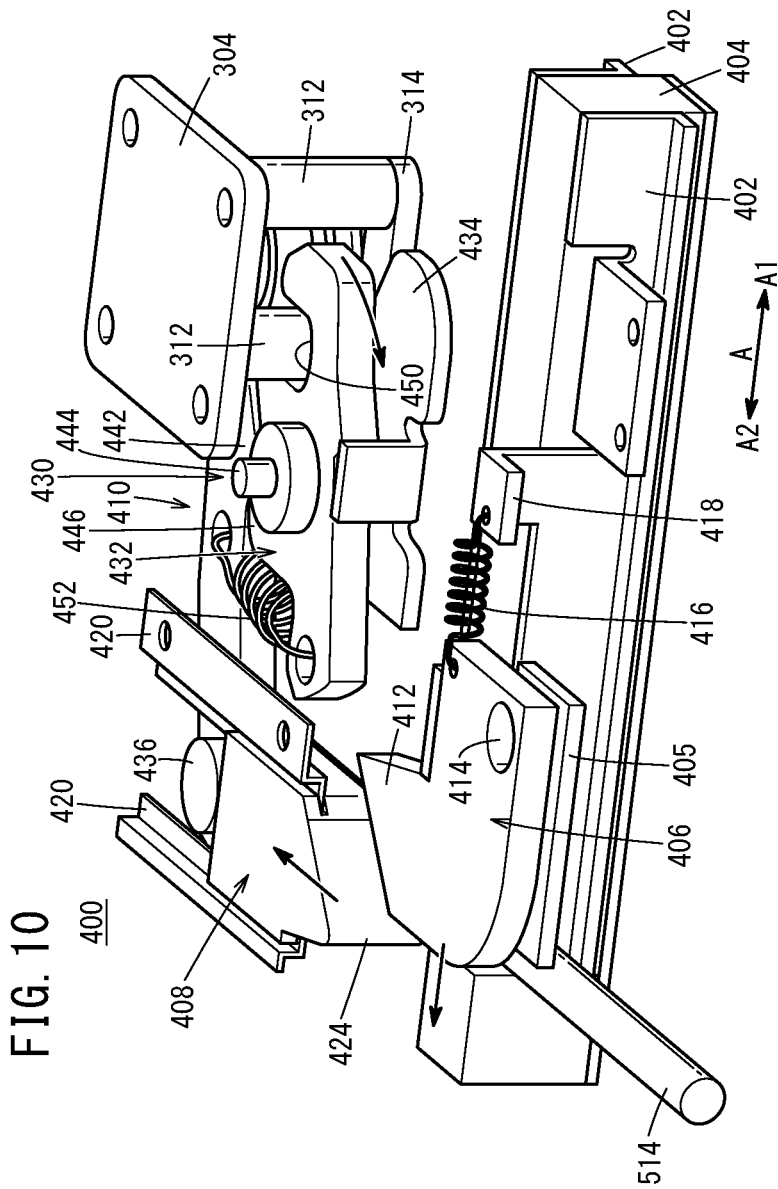
FIG. 10 is a schematic perspective view showing the main parts of the lock mechanism of FIG. 9.

As shown in FIG. 10, two cylinder-shaped legs 312 are provided so as to hang under the moved plate 304. The legs 312 are coupled by a substantially oval-shaped oval plate 314.

As shown in FIGS. 9 and 10, the lock mechanism 400 includes a rack slide 404 that can be displaced along a set of rack guide rails 402 provided on the support board 200, a claw-shaped member 406 that is supported by a displaceable plate 405 attached to the rack slide 404 so that it can be displaced integrally with the rack slide 404 and the displaceable plate 405, a cam member 408, and a snatch lock 410.

Among these members, the rack guide rails 402 extend in the arrow A direction and thus the rack slide 404, displaceable plate 405, and claw-shaped member 406 are displaced to come closer to or separate away from the device-side charging connector 112 (or they move backward or frontward). FIG. 9 shows the state in which the rack slide 404, displaceable plate 405, and claw-shaped member 406 are located closest to the device-side charging connector 112, i.e. at the backmost position. At this time, the charging tray 104 is also back on the side of the backboard 102 (on the side of the A2 direction, see FIG. 7). The device-side charging connector 112 is located at its bottom dead center.

The claw-shaped member 406 has a first cam portion 412 that projects substantially orthogonal to the arrow A direction. The claw-shaped member 406 has an insertion hole (not shown) formed at its one corner at the rear end and a first pivot shaft 414 is fitted in the insertion hole. The claw-shaped member 406 is joined to the displaceable plate 405 through the first pivot shaft 414 and can pivot on the first pivot shaft 414. One end of a first return spring 416 is attached to another corner of the claw-shaped member 406 that is opposite to the one corner mentioned above.

A flat-plate-like spring attaching portion 418 is provided to one of the rack guide rails 402 such that the spring attaching portion 418 projects in a direction orthogonal to the lengthwise direction of the rack guide rails 402. The other end of the first return spring 416 is attached to the spring attaching portion 418. That is, the first return spring 416 pulls the claw-shaped member 406 toward the spring attaching portion 418 (frontward or to A1 side).

A set of cam guide rails 420 are supported at the rear end of the rack guide rails 402 that is close to the device-side charging connector 112 and the cam guide rails 420 extend in a direction substantially orthogonal to the lengthwise direction of the rack guide rails 402 (the arrow A direction). The cam member 408 has its upper end slidably supported between the cam guide rails 420.

As the rack slide 404 is displaced toward or away from the device-side charging connector 112, the cam member 408 is displaced in the direction substantially orthogonal to the direction of the displacement of the rack slide 404, while guided by the cam guide rails 420. This will be described later.

The cam member 408 has a second cam portion 424 that works together with the first cam portion 412 of the claw-shaped member 406. The second cam portion 424 faces the first cam portion 412.

The snatch lock 410 includes a link member 430, a hook member 432, and a backup plate 434 that pivotably supports the link member 430 and hook member 432.

Figure 11:
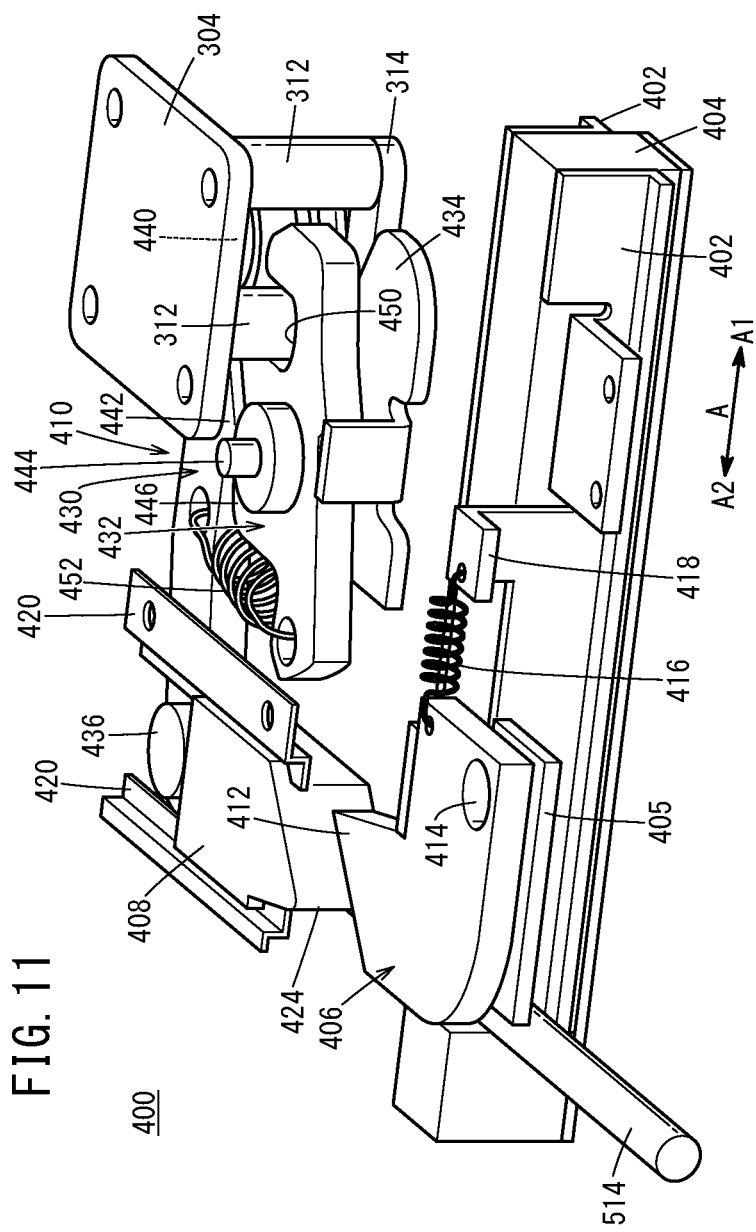
FIG. 11 is a schematic perspective view showing the main parts, where the moved plate has been displaced from the position of FIG. 10 and a link member has somewhat pivoted.
Figure 12:
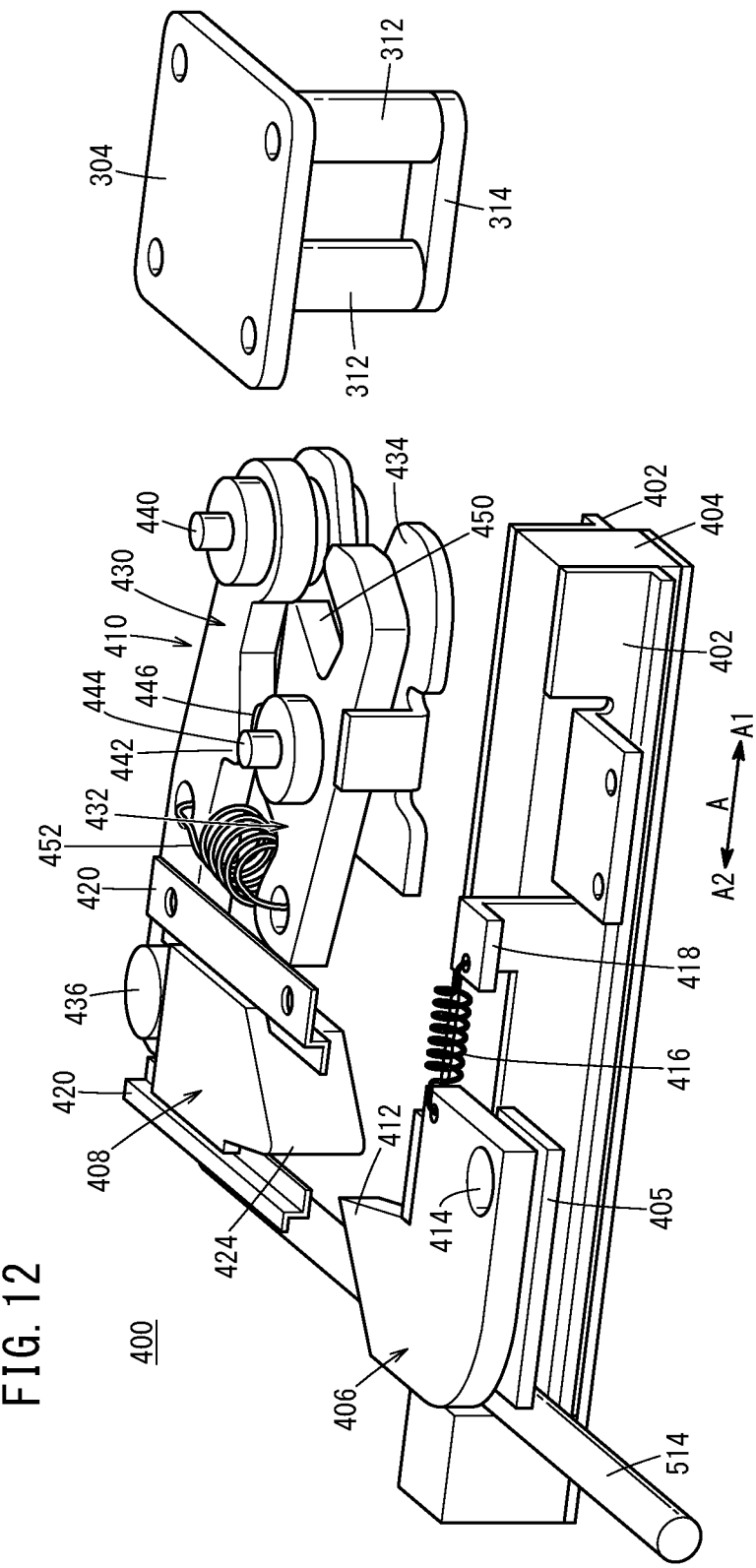
FIG. 12 is a schematic perspective view showing the main parts, where the link member has further pivoted from the position of FIG. 11 and the moved plate has been released.

The link member 430 has its rear end coupled to one end of the cam member 408 through a coupling shaft 436. Also, the link member 430 has its front end pivotably coupled to the backup plate 434 through a second pivot shaft 440 (particularly, see FIG. 12). Accordingly, as shown in FIGS. 11 and 12, the link member 430 changes its posture as the cam member 408 is displaced along the cam guide rails 420.

The link member 430 has a first protrusion 442 that is formed at a middle position between the coupling shaft 436 and the second pivot shaft 440 to protrude toward the hook member 432.

The hook member 432 is rotatably supported by the backup plate 434 through a third pivot shaft 444 provided in substantially the center thereof.

The hook member 432 has a second protrusion 446 that protrudes toward the first protrusion 442 of the link member 430. The first protrusion 442 and the second protrusion 446 can move past each other when the link member 430 and the hook member 432 pivot (see FIGS. 10 to 12).

The hook member 432 has a hook portion 450 at its front end, which is formed of a U-shaped cut at a position facing the link member 430. A leg 312 of the moved plate 304 is restricted by the hook portion 450 when the link member 430 and the hook member 432 are in a given positional relation. As will be described later, this restriction positions and fixes the charging tray 104 at the backmost position. On the other hand, as shown in FIGS. 11 and 12, when the rack slide 404 is displaced (moved backward) toward the device-side charging connector 112 and the claw-shaped member 406 presses the cam member 408, then the hook member 432 pivots as shown in FIGS. 11 and 12. This pivoting motion releases the leg 312 of the moved plate 304 from the hook portion 450.

A second return spring 452 is hung tensionally between the hook member 432 and the link member 430. The second return spring 452 has its one end attached to a rear end of the hook member 432 and its other end attached to the link member 430 at a position intermediate between the coupling shaft 436 and the first protrusion 442. The second return spring 452 pulls the rear end of the hook member 432 toward the link member 430.

As shown in FIG. 13, the raising and lowering mechanism 500 for raising and lowering the device-side charging connector 112 includes a raising and lowering motor 502, a worm 504, a worm gear 506, a rack-side gear 508 having teeth projecting parallel to its axis, and a link assembly 510 that couples the rack slide 404 and the device-side charging connector 112. The worm 504 is attached to the rotating shaft of the raising and lowering motor 502 and engages with the worm gear 506. The worm gear 506 and the rack-side gear 508 are coupled through a transmission shaft 512, and the rack-side gear 508 engages with teeth (not shown) provided in the under surface of the rack slide 404.

The link assembly 510 includes a first shaft 514 disposed at a rear end of the rack slide 404 to extend in a direction substantially orthogonal to the arrow A direction, and a set of arm members 518 extending to reach under the device-side charging connector 112, where each arm member 518 has an elongated hole 516 formed at its upper end to allow the first shaft 514 to pass therethrough. Each arm member 518 extends so as to incline from A2 side to A1 side and then bends to incline from A1 side to A2 side. A second shaft 520 is passed through the bent portions of the set of arm members 518.

Further, each arm member 518 has its rear end coupled to a bearing portion 522 provided near the guided portion 120. That is, the bearing portion 522 has an elongated hole 524 extending along the arrow A direction. A third shaft 525 is coupled to the rear ends of the arm members 518 and the third shaft 525 is passed through the elongated holes 524.

Figure 14:
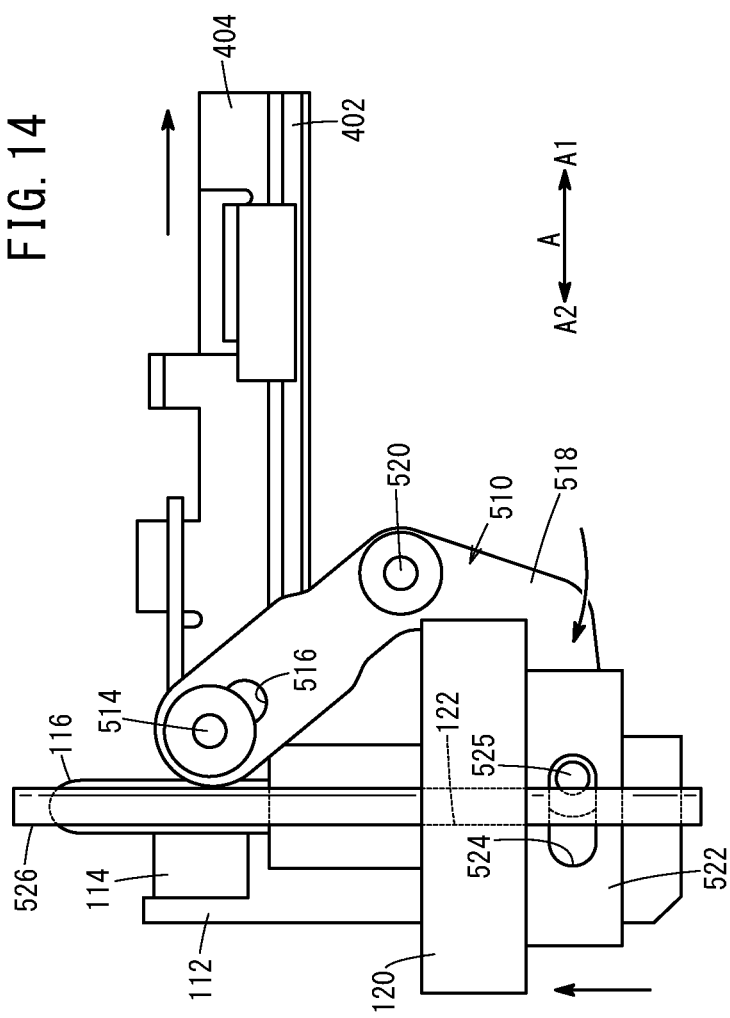
FIG. 14 is schematic side view showing the main parts where the device-side charging connector has been lowered under an action of the raising and lowering mechanism of FIG. 13.
Figure 15:
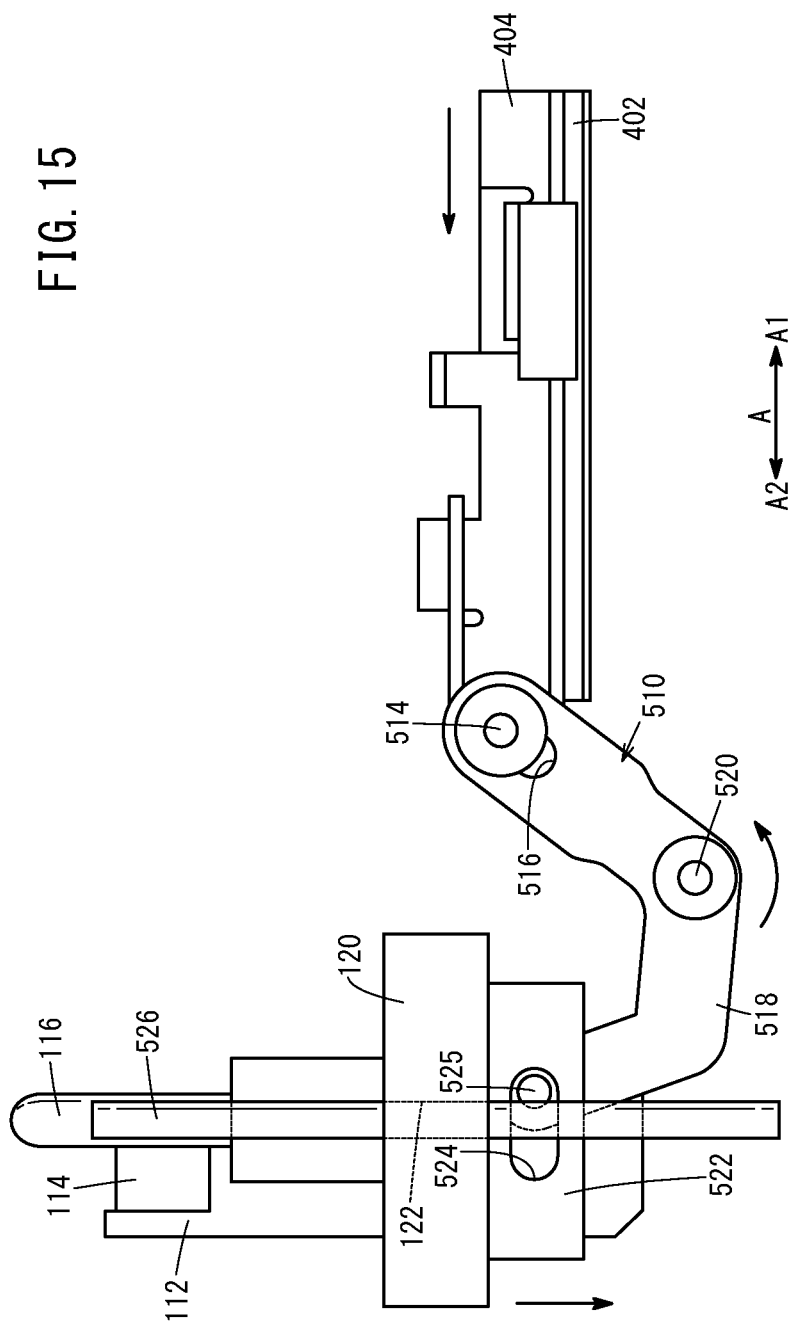
FIG. 15 is a schematic side view showing the main parts where the device-side charging connector has been raised under an action of the raising and lowering mechanism of FIG. 13.

When the raising and lowering motor 502 is energized, the worm 504, worm gear 506, transmission shaft 512, and rack-side gear 508 rotate. Hence, the rack slide 404 is displaced along the A1 direction in FIG. 11. As will be described later, as shown in FIGS. 14 and 15, the arm members 518 pivot following this displacement. FIG. 14 shows the device-side charging connector 112 at its bottom dead center and FIG. 15 shows the device-side charging connector 112 at its top dead center.

The raising and lowering mechanism 500 further includes guide rods 526 inserted in guide holes 122 of the guided portions 120 of the device-side charging connector 112. The guide rods 526 guide the device-side charging connector 112 being raised or lowered.

The tray discharge springs 310 expand to pull the charging tray 104 in the A1 direction when the charging tray 104 is not restricted by the snatch lock 410.

Next, the lower-stage rotary table 54a provided under the charging section 90 will be described.

Figure 17:
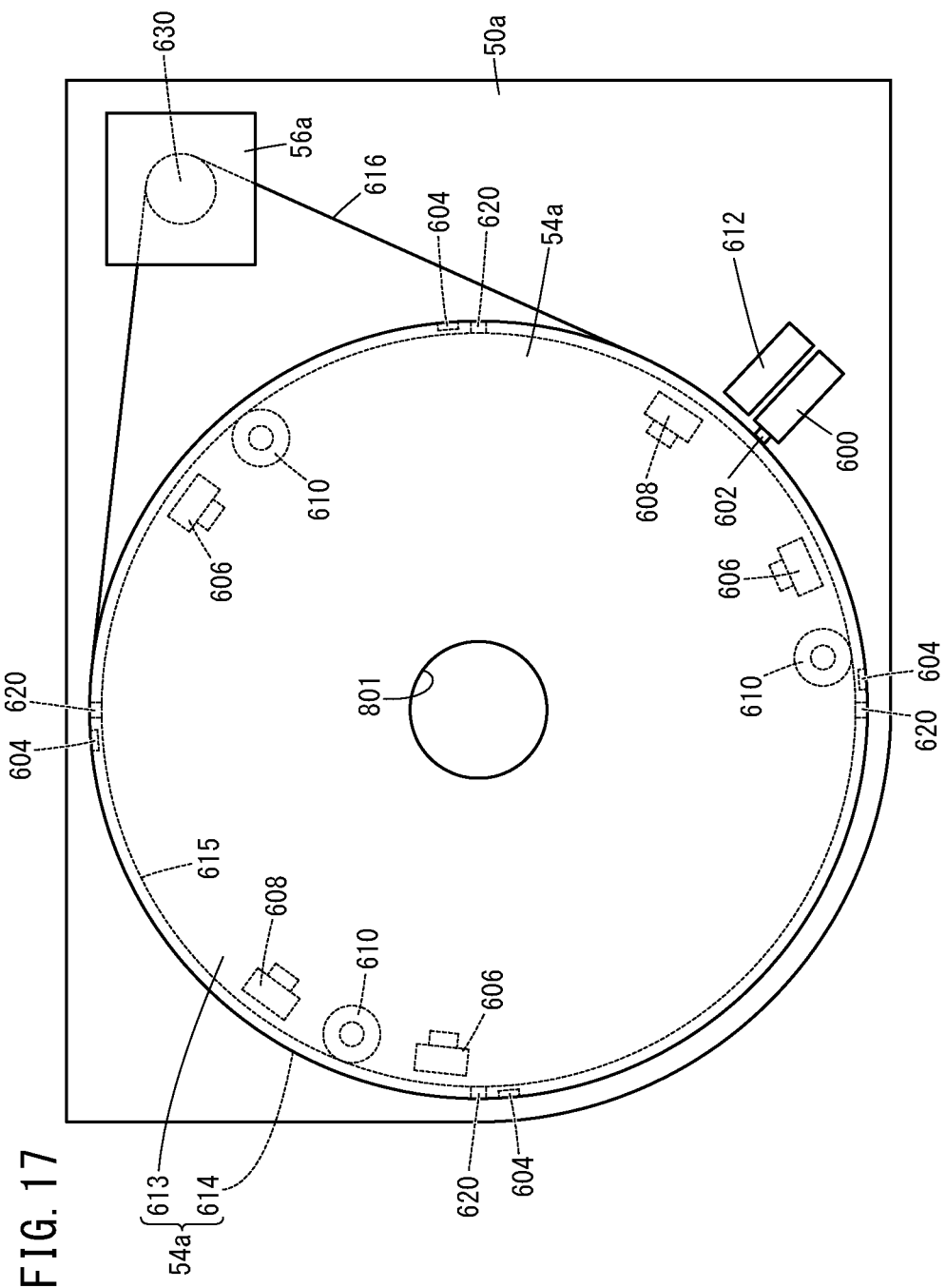
FIG. 17 is a schematic plan view showing the main parts where the lower-stage rotary table is supposed by first to third cam followers.

As shown in FIG. 17, on the lower-side base plate 50a, a phase retaining cylinder 600 (positioning mechanism) is provided to retain the position of the lower-stage rotary table 54a. The phase retaining cylinder 600 has an extending and retracting rod 602; when the extending and retracting rod 602 extends forward, it enters a fitting recess 604 formed in a circumferential wall of the lower-stage rotary table 54a. This hinders rotation of the lower-stage rotary table 54a and retains it at that phase.

The lower-side base plate 50a is further provided with first cam followers 606 that receive heavy loads, second cam followers 608 that receive light loads, third cam followers 610 for centering of the lower-stage rotary table 54a, and an interlock switch 612. The lower-stage rotary table 54a is supported by the first cam followers 606, second cam followers 608, and third cam followers 610, whereby the lower-stage rotary table 54a can be positioned at some interval above the lower-side base plate 50a.

Figure 16:
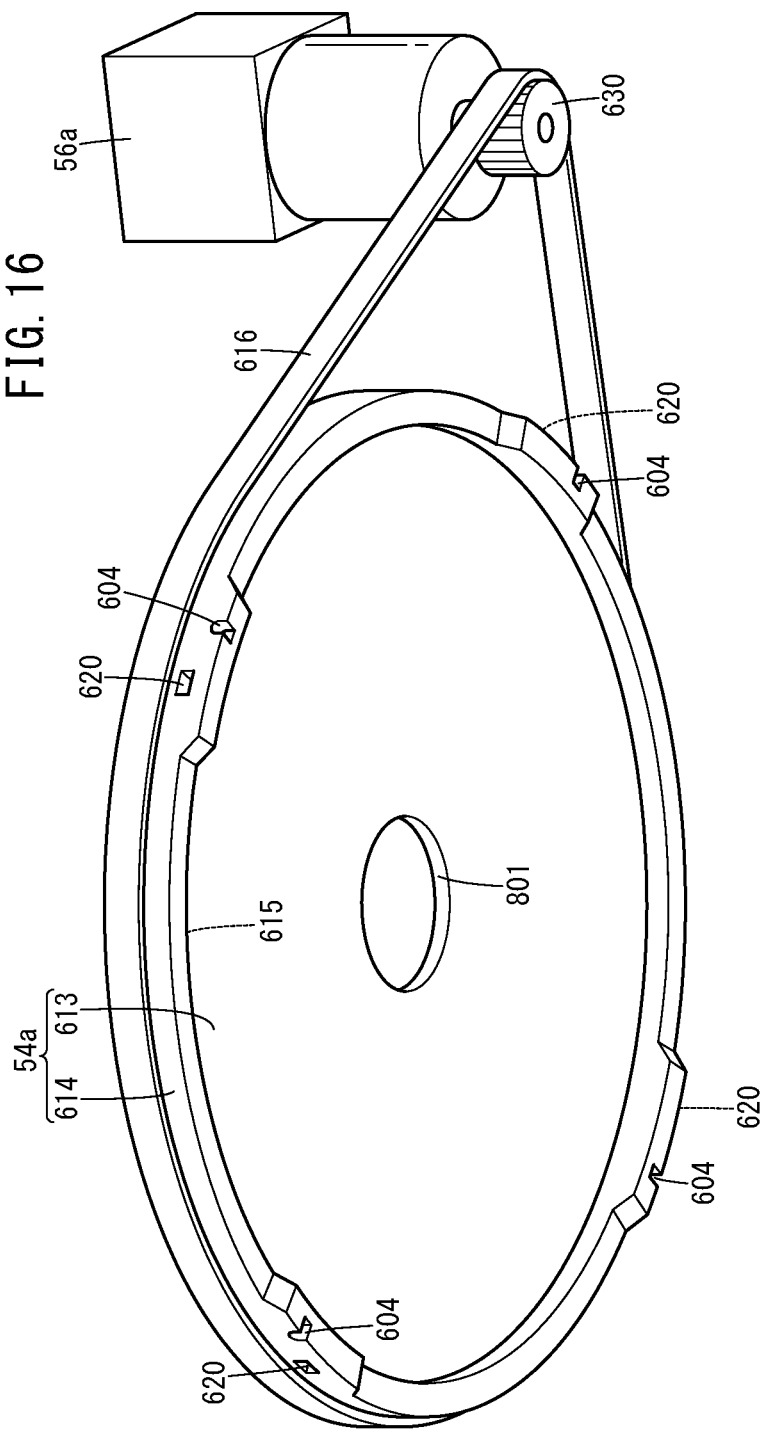
FIG. 16 is a schematic overall perspective view showing the lower-stage rotary table seen from below.

As shown in FIG. 16, the lower-stage rotary table 54a includes a disk-shaped body 613 and a ring body 614 somewhat thicker than the disk-shaped body 613; the ring body 614 is fitted around the circumferential wall of the disk-shaped body 613. The first cam followers 606 and the second cam followers 608 slidingly contact the back surface of the disk-shaped body 613. On the other hand, the third cam followers 610 slide in a sliding groove 615 formed in the inner circumferential wall of the ring body 614. The outer circumferential wall of the ring body 614 has formed therein a wind groove (not shown) in which a timing belt 616 is wound.

The above-mentioned fitting recesses 604 and latch grooves 620 are formed in the outer circumferential wall of the ring body 614. These fitting recesses 604 and latch grooves 620 are arranged at intervals of 90°.

Figure 18:
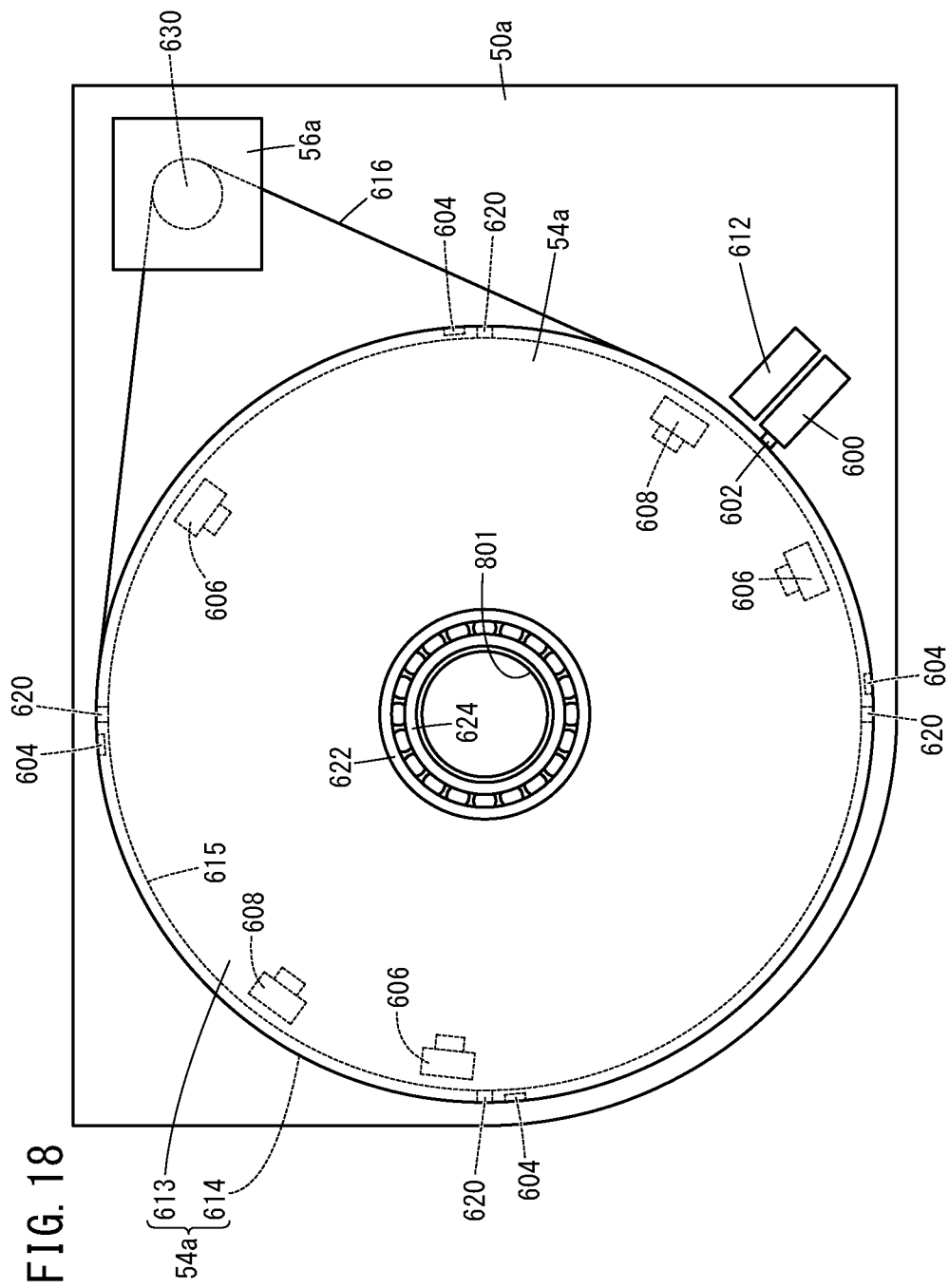
FIG. 18 is a schematic plan view showing the main parts where the lower-stage rotary table is supposed by first cam followers, second cam followers, and a bearing holder.

As shown in FIG. 18, a bearing 622 may be provided on the lower-side base plate 50a in place of the third cam followers 610. In this case, a bearing holder 624 is provided to the lower-stage rotary table 54a (disk-shaped body 613), and the bearing 622 and the bearing holder 624 can achieve centering of the lower-stage rotary table 54a. This provides the advantage of reducing the number of parts. Thus, it is not particularly necessary to provide the third cam followers 610.

The timing belt 616 is hung on a pulley 630 fitted around the rotating shaft of the lower-stage driving motor 56a so as to constitute a rotational force transmitting system. Thus, as the rotating shaft of the lower-stage driving motor 56a rotates, the pulley 630 rotates and the timing belt 616 circles, whereby the lower-stage rotary table 54a turns. The interlock switch 612 detects the above-mentioned latch grooves 620 of the lower-stage rotary table 54a thus turned.

Figure 19:
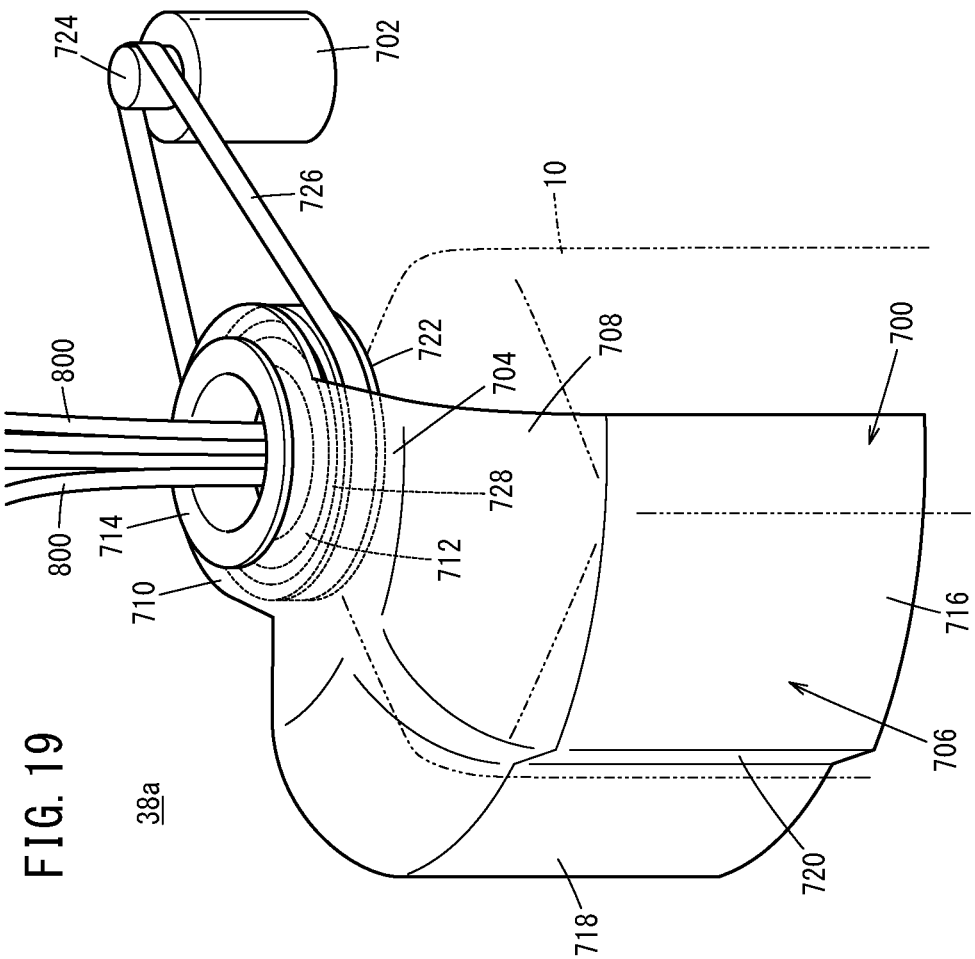
FIG. 19 is a schematic perspective view showing the main parts of a first opening and closing shutter as an opening and closing shutter.

As shown in FIG. 19, the first opening and closing shutter 38a includes a shutter body 700. The shutter body 700 turns under an action of a shutter opening and closing motor 702. The shutter body 700 has a first portion 704 that is shaped like a fan and covers the upper side of the battery 10 (the arch portion 12, tab-like projection 14, and holding bar 16), a second portion 706 that covers side surfaces of the battery 10, and a third portion 708 that curves and expands between the first portion 704 and the second portion 706. Further, a ring-like driving force transmitting portion 710 is provided in the center of the first portion 704, with a shutter bearing holder 712 and a shutter bearing 714 provided in the driving force transmitting portion 710.

Figure 20:
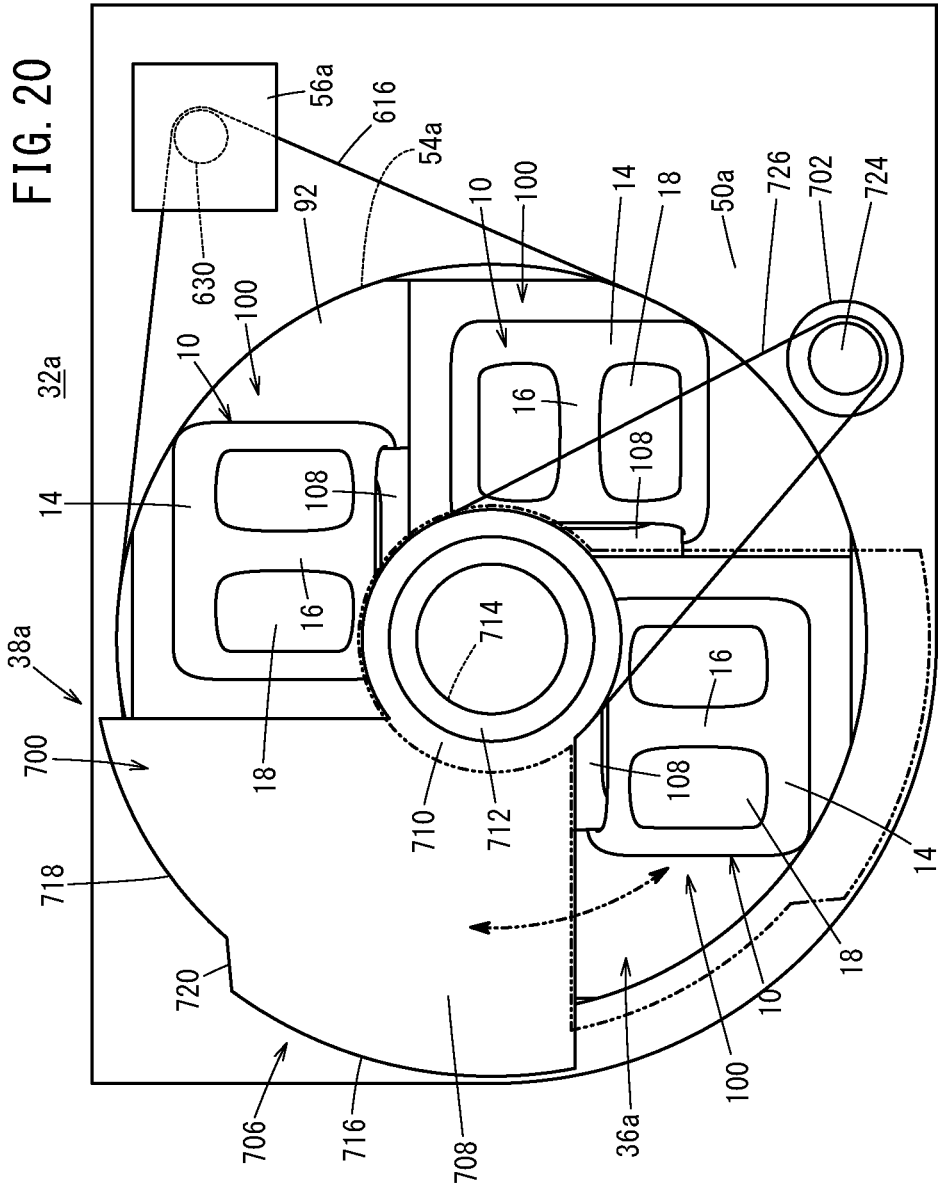
FIG. 20 is a schematic plan view showing the main parts where the shutter body is opened.

As shown in FIG. 20, in plan view, the shutter body 700 has a fourth portion 716 and a fifth portion 718 that have different radii connecting the center of the shutter bearing 714 and the outer circumference of the second portion 706, and a sixth portion 720 that is interposed between the fourth portion 716 and the fifth portion 718.

The shutter bearing 714 is disposed at a position higher than the top end of the battery 10 placed on the charging stand 100 (the arch portion 12, tab-like projection 14, and holding bar 16). This prevents the battery 10 from interfering with the shutter bearing 714.

Also, the shutter opening and closing motor 702 is located at the side of the shutter bearing 714 and outside of the outer circumference of the lower-stage rotary table 54a (see FIG. 20). That is, the shutter opening and closing motor 702 is not located in a position that overlaps under or above the lower-stage rotary table 54a. This allows the magazine-type charging device 30 to have a smaller height and to be smaller-sized.

A large pulley 722 (or a large sprocket) is provided as a transmission mechanism on the outside of the shutter bearing 714. An opening and closing belt 726 (or an opening and closing chain) is hung across the large pulley 722 and the small pulley 724 (or a small sprocket) provided at the rotating shaft of the shutter opening and closing motor 702. Preferably, a torque limiter 728 is provided to the large pulley 722.

Power-supply cables 800 (cables) are electrically connected to the device-side charging connectors 112. The power-supply cables 800 are passed through a through hole 801 formed in the center of the lower-stage rotary table 54a (see FIGS. 5, 16 and 17), and then, above its center, they are passed further through the quadrangular hollow portion 802 (see FIGS. 6 and 7) that is formed by the backboards 102 combined together, from a position higher than the top ends of the batteries 10 placed on the charging stands 100. The power-supply cables 800 are bound together by a binding band 804 so as to prevent a twist from spreading to the lower-stage chargers 52a.

The second unit magazine 32b is configured in the same way as the first unit magazine 32a. Accordingly, the same constituent elements are labeled using the same reference numerals and will not be described in detail again. In the second unit magazine 32b, the inside base plate 50b is the member that corresponds to the lower-side base plate 50a of the first unit magazine 32a.

The magazine-type charging device 30 of this embodiment is basically configured as described so far. Next, functions and effects thereof will be described in conjunction with how the batteries 10 are fixed. The description below shows an example in which two batteries 10 are exchanged at the same time, but it is a matter of course that a single battery 10 may be exchanged.

Figure 21:
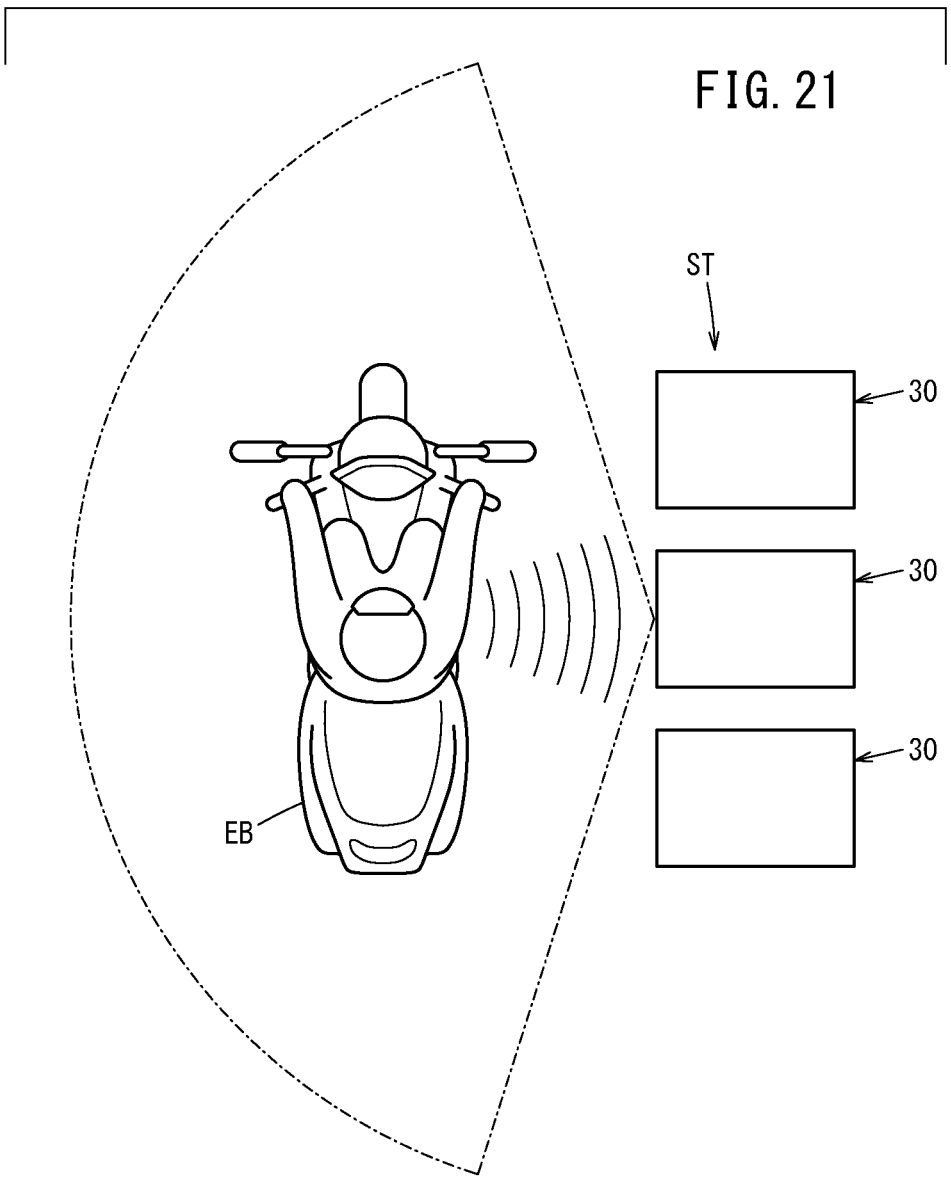
FIG. 21 is a schematic plan view showing a charging station provided with magazine-type charging devices of FIG. 3.

The batteries 10 are used as a driving source of an electric motorbike EB shown in FIG. 21, for example. Batteries 10 that have been used to run the electric motorbike EB and whose discharge capacity has reduced are recharged in the magazine-type charging device 30.

The magazine-type charging device 30 is installed at a certain charging station ST provided outdoors. A user can approach the magazine-type charging device 30 on the electric motorbike EB or on foot. At this time, the first opening and closing shutter 38a and the second opening and closing shutter 38b are both closed.

As mentioned earlier, the electric motorbike EB or a smartphone or RF key that the user holds is provided with a transmitter. A receiver provided to the casing 34 of the magazine-type charging device 30, mentioned earlier, receives a signal sent from the transmitter. When the control device 60 has recognized that the receiver has received the signal over a predetermined given time, the control device 60 sends a command signal indicating "open the shutters" to the shutter opening and closing motor 702 (see FIG. 19). The control device 60 keeps the shutters 38a, 38b open while the receiver is receiving the signal from the transmitter for the given time.

The electric motorbike EB, for example, may just pass by the charging station ST. In this case, even if the receiver receives the signal from the transmitter, the period of reception is short. In this case, control is performed such that the shutter bodies 700 do not turn.

The shutter opening and closing motor 702 is energized on the basis of the command signal "open the shutters", and then the small pulley 724 rotates and the opening and closing belt 726 circles. As a result, the large pulley 722 as a transmission mechanism turns to turn the shutter body 700 around the driving force transmitting portion 710 to which the large pulley 722 is provided (see FIGS. 19 and 20). The first opening and closing shutter 38a and second opening and closing shutter 38b thus open. Then, the charging sections 90 positioned in the first storage position 36a and the second storage position 36b, and the charging stands 100, are exposed out of the casing 34.

In this way, according to this embodiment, the shutter body 700 automatically turns without requiring the user to turn the shutter body 700. Hence, the user can extract recharged batteries 10 just by approaching the magazine-type charging device 30 and can set spent or insufficiently charged batteries 10 into the magazine-type charging device 30.

As shown in FIG. 20, in plan view, the shutter body 700 has the fourth portion 716 and the fifth portion 718 that have different radius lengths connecting the center of the shutter bearing 714 and the outer circumference of the second portion 706. Accordingly, a shorter length is needed in the depth direction when the shutter body 700 changes from the closed state to opened state. This reduces the area taken up by the installation of one magazine-type charging device 30.

An object like a hand of the user, for example, may touch the shutter body 700 while the shutter body 700 is being opened. In this case, torque acts on the shutter body 700. If the large pulley 722 is provided with the torque limiter 728, the control device 60 detects the torque through the torque limiter 728 and then stops the opening operation of the shutter body 700. This prevents excessive load from acting on the shutter body 700 and the shutter bearing 714 and also prevents the object from becoming caught by the shutter body 700. Instead of stopping the opening operation, the shutter body 700 may be changed from the opening operation to closing operation.

After the first opening and closing shutter 38a and the second opening and closing shutter 38b have opened, the user places batteries 10 that require charging, onto the charging trays 104 that are kept in the state slid to the front, in the charging stands 100 of the first unit magazine 32a and the second unit magazine 32b, with the entry opening 20 of each battery 10 being positioned to face the backboard 102 (or the judging projection 108). That is, the batteries 10 requiring charging are inserted into the casing 34 from the first storage position 36a and the second storage position 36b shown in FIG. 3. Since the first storage position 36a and the second storage position 36b are offset from each other, it is very easy to take out recharged batteries 10 from the charging stands 100 of the first unit magazine 32a and the second unit magazine 32b and to put the charge-requiring batteries 10 onto the charging stands 100.

When placing the charge-requiring batteries 10 onto the charging trays 104, the user may erroneously remove the hand from the holding bar 16. In this case, the impact-absorbing springs 306 (see FIG. 9) and the first cam followers 606 (see FIGS. 17 and 18) receive the load of the dropped battery 10, and the retractable rollers 302 fall downward. This prevents damage to the charging tray 104, lock mechanism 400, sliding mechanism 300 including the roller bodies of the retractable rollers 302, and the like.

When the charge-requiring battery 10 is placed on the charging tray 104, the device-side charging connector 112 gets lower and positioned below the lower-stage rotary table 54a (see FIG. 6). Accordingly, for example, even if the user wrongly places the battery 10 on the charging tray 104 in such a position that the tab-like projection 14 faces the backboard 102 (judging projection 108), it is possible to effectively prevent the bottom surface of the battery 10 where the battery-side charging and discharging connector 22 is absent from abutting on the device-side charging connector 112. This prevents damage to the device-side charging connector 112 due to the abutment.

After placing the battery 10 on the charging tray 104, the user presses the charging tray 104 toward the backboard 102. In other words, the user slides the charging tray 104 with the battery 10 thereon to the side of the backboard 102 (backward or to A2 side). The attaching plates 305 are thus displaced backward integrally with the charging tray 104, causing the tray discharge springs 310 to expand from the contracted state. When the user has slid the charging tray 104 to the backmost position, the charging tray 104 is locked in that position by the snatch lock 410. The operation of the snatch lock 410 at this time will be described below in further detail.

As shown in FIG. 12, before the charging tray 104 is slid backward, the snatch lock 410 is positioned such that the hook portion 450 of the hook member 432 is away from the front end of the link member 430. At this time, the second protrusion 446 is positioned ahead (frontward) of the first protrusion 442 and away from the first protrusion 442.

As the charging tray 104 is slid backward, the rear leg 312 presses the inner wall of the rear end side of the hook portion 450. This pressing causes the hook member 432 to pivot on the third pivot shaft 444, whereby the hook portion 450 comes closer to the front end of the link member 430 and the second return spring 452 gradually expands.

As the amount of pivoting motion of the hook member 432 increases, the second protrusion 446 engages the first protrusion 442 and presses it.

Meanwhile, when the second protrusion 446 moves past the first protrusion 442, the hook member 432 pulls the link member 430 through the second return spring 452. This changes the posture of the link member 430, i.e. changes the direction of inclination of the link member 430 in the A direction, and then the cam member 408 is displaced toward the claw-shaped member 406. Then, the pivoting motions of the hook member 432 and the link member 430 stop.

When the pivoting motion of the hook member 432 has stopped, the opening of the hook portion 450 faces the link member 430. That is, the hook portion 450 closes (see FIGS. 9 and 10). Also, in this state, the second protrusion 446 is positioned more backward from the first protrusion 442. In this state, even if an attempt is made to slide the charging tray 104 frontward, the charging tray 104 does not slide because the action that the second protrusion 446 presses the first protrusion 442 forces the hook member 432 and the link member 430 to make unattainable movement. Thus, the leg 312 is restricted by the hook portion 450 and the charging tray 104 is locked in the position close to the device-side charging connector 112.

The judging projection 108 enters the entry opening 20 of the battery 10 that has been slid to the backboard 102 side. With the entrance, the proximity sensor 106 provided in the backboard 102 senses the presence of the battery 10. Receiving this sense signal, the control device 60 recognizes that "the battery 10 has moved to the proper charging position".

On the other hand, if the battery 10 has been inserted in the wrong way and the tab-like projection 14 faces the backboard 102, the tab-like projection 14 abuts on the judging projection 108. This is because, as shown in FIG. 1A, H2>H1 and so the top end of the tab-like projection 14 is higher than the lower end of the arch portion 12 (the bottom side of the entry opening 20) and the tab-like projection 14 is a closed portion. Thus, the battery 10 is stopped and the charging tray 104 cannot be slide further backward. In this case, the proximity sensor 106 does not sense presence of the battery 10 and the control device 60 does not recognize that "the battery 10 has moved to the proper charging position". The user can visually notice this condition to recognize that the battery 10 has been inserted in the wrong direction (posture). The battery 10 can then be taken out and reentered in the proper posture.

When the control device 60 recognizes that "the battery 10 has moved to the proper charging position", the control device 60 energizes the raising and lowering motor 502 (see FIGS. 9 and 13) with a command signal. This causes the worm 504 to rotate and the worm gear 506, transmission shaft 512, and the rack-side gear 508 to follow the rotation, displacing the rack slide 404 away from the device-side charging connector 112. That is, the rack slide 404 advances in the A1 direction.

As the rack slide 404 advances, the first shaft 514 provided at the rear end of the rack slide 404 also advances integrally in the A1 direction. Then the top ends of the arm members 518, with the first shaft 514 passing through their elongated holes 516, are pulled frontward (in the A1 direction). The lower ends of the arm members 518 thus ascend. As a result, the arm members 518 pivot to change from the posture shown in FIG. 14 to the posture shown in FIG. 15. Since the guided portions 120 are restricted by the guide rods 526, the device-side charging connector 112 follows the pivoting motion of the arm members 518 to ascend up in the vertical direction.

Figure 22:
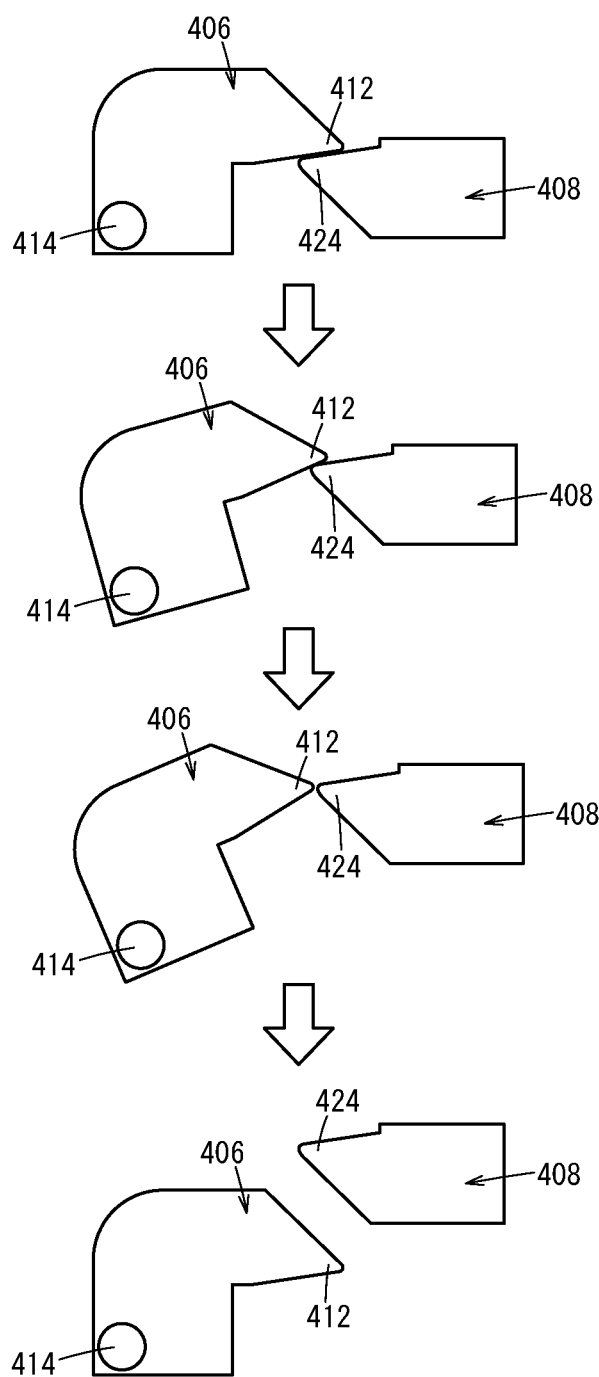
FIG. 22 is a schematic flow diagram illustrating the posture of a claw-shaped member moving frontward and the positional relation between the claw-shaped member and cam member.

Now, a description will be given about the fact that, even when the rack slide 404 advances, the cam member 408 keeps the position displaced to the claw-shaped member 406 side and the locked state of the charging tray 104 is not released in the manner described later. As the rack slide 404 advances, the displaceable plate 405 and the claw-shaped member 406 integrally advance. At this time, as shown in FIG. 22, the end of the first cam portion 412 of the advancing claw-shaped member 406 interferes with the end of the second cam portion 424 of the cam member 408.

Since the end of the first cam portion 412 interferes with the end of the second cam portion 424 of the cam member 408, the second cam portion 424 presses the first cam portion 412 when the rack slide 404 attempts to further advance. The claw-shaped member 406 thus pressed pivots on the first pivot shaft 414 such that the first cam portion 412 moves backward. At the same time, the first return spring 416 expands.

This pivoting motion removes the interference of the first cam portion 412 with the second cam portion 424. When the first cam portion 412 is positioned frontward of the second cam portion 424 as the rack slide 404 advances, the first return spring 416 contracts and pulls the claw-shaped member 406 frontward. As a result, the claw-shaped member 406 pivots in the opposite direction to return to the original posture. Further pivoting motion of the claw-shaped member 406 in this opposite direction is restricted.

Figure 23:
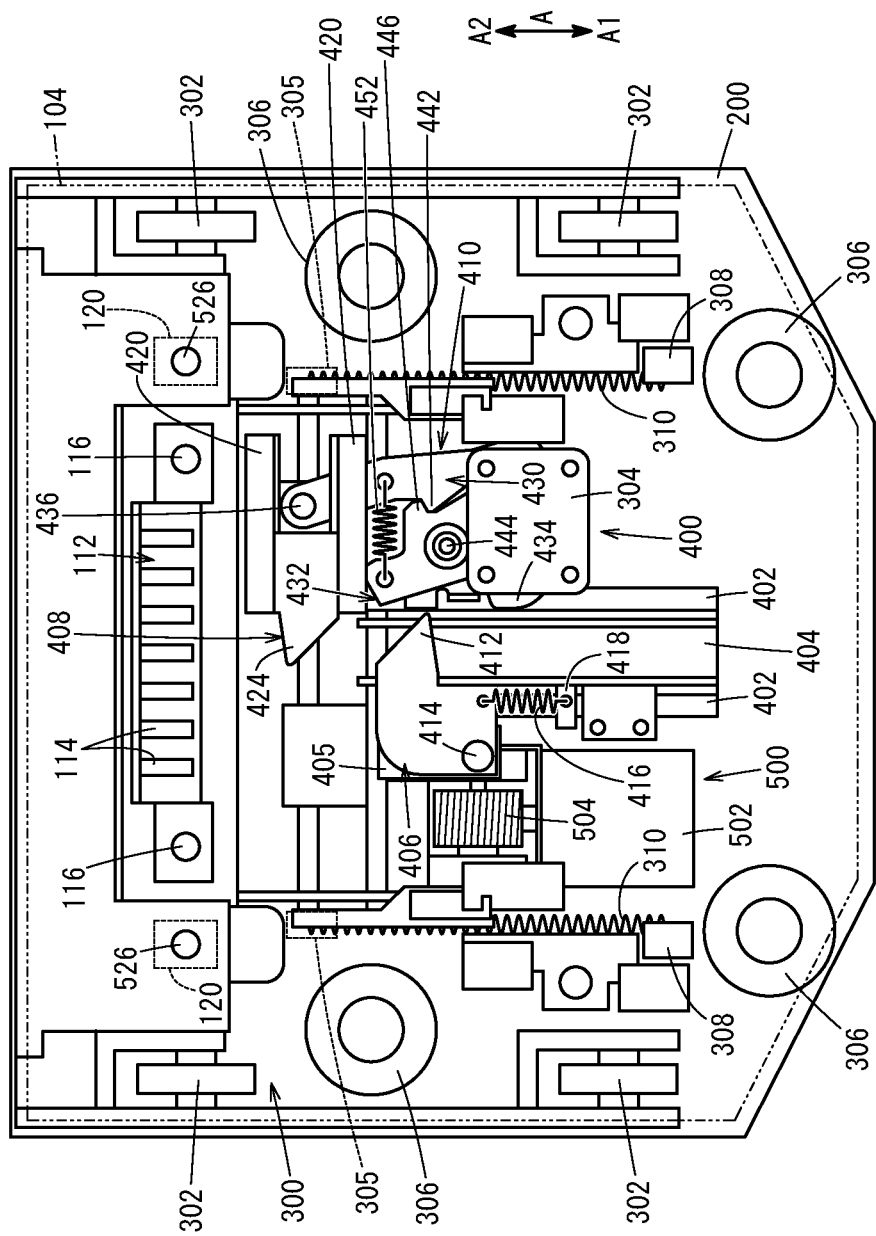
FIG. 23 is a schematic plan view showing the condition where the claw-shaped member has advanced and the lock mechanism has restricted the charging tray.

During ascending, the guided portions 120 of the device-side charging connector 112 are guided by the guide rods 526 passing through the guide holes 122. The device-side charging connector 112 thus ascends toward the connector hole 110. FIG. 23 shows the condition in which the rack slide 404, displaceable plate 405, and claw-shaped member 406 have advanced to the frontmost position.

The device-side charging connector 112 thus raised passes through the connector hole 110 of the charging tray 104 and is fitted with the battery-side charging and discharging connector 22. That is, the plate-like terminals 114 enter the plate-like terminal entry recesses 24 (see FIG. 2) and the two fitting rods 116 enter the rod entry recesses 26.

The battery 10 is firmly supported on the charging stand 100 by the fitting of the device-side charging connector 112 with the battery-side charging and discharging connector 22 and the entry of the judging projection 108 in the entry opening 20. Particularly, the judging projection 108 loads an insertion load reaction force onto the bottom side of the entry opening 20. This prevents displacement and unsteadiness, and falling of the battery 10.

In this way, according to this embodiment, when inserting (storing) a charge-requiring battery 10 into the casing 34 of the magazine-type charging device 30 from the first storage position 36a or second storage position 36b, it is possible to know whether the battery 10 has been inserted in the proper posture just by conducting a simple operation of sliding to the backboard 102 side the charging tray 104 on which the battery 10 is placed. At the same time, it is also possible to prevent damage to the device-side charging connector 112 or the battery-side charging and discharging connector 22 and to firmly hold the battery 10.

Further, an alarm sound may be generated if a certain time has passed after a user inserted a charge-requiring battery 10 but the device-side charging connector 112 does not ascend. This allows the user to know whether the charge-requiring battery 10 has been inserted in the wrong posture or the device-side charging connector 112 does not ascend due to some reason.

After that, the control device 60 sends a command signal to the shutter opening and closing motor 702 to rotate the small pulley 724 and circle the opening and closing belt 726 so as to turn the large pulley 722. As a result, the shutter body 700 turns about the driving force transmitting portion 710 (see FIG. 20), closing the first opening and closing shutter 38a, the second opening and closing shutter 38b. This prevents the user from putting his or her hand into the casing 34, for example.

In this way, according to this embodiment, the batteries 10 and the charging stands 100 are protected by the casing 34, first opening and closing shutter 38a, and second opening and closing shutter 38b. This prevents the batteries 10, charging stands 100, and the like from contacting rainwater and dust even when they are placed outdoors. That is, the magazine-type charging device 30 can be used favorably even outdoors.

Figure 24:
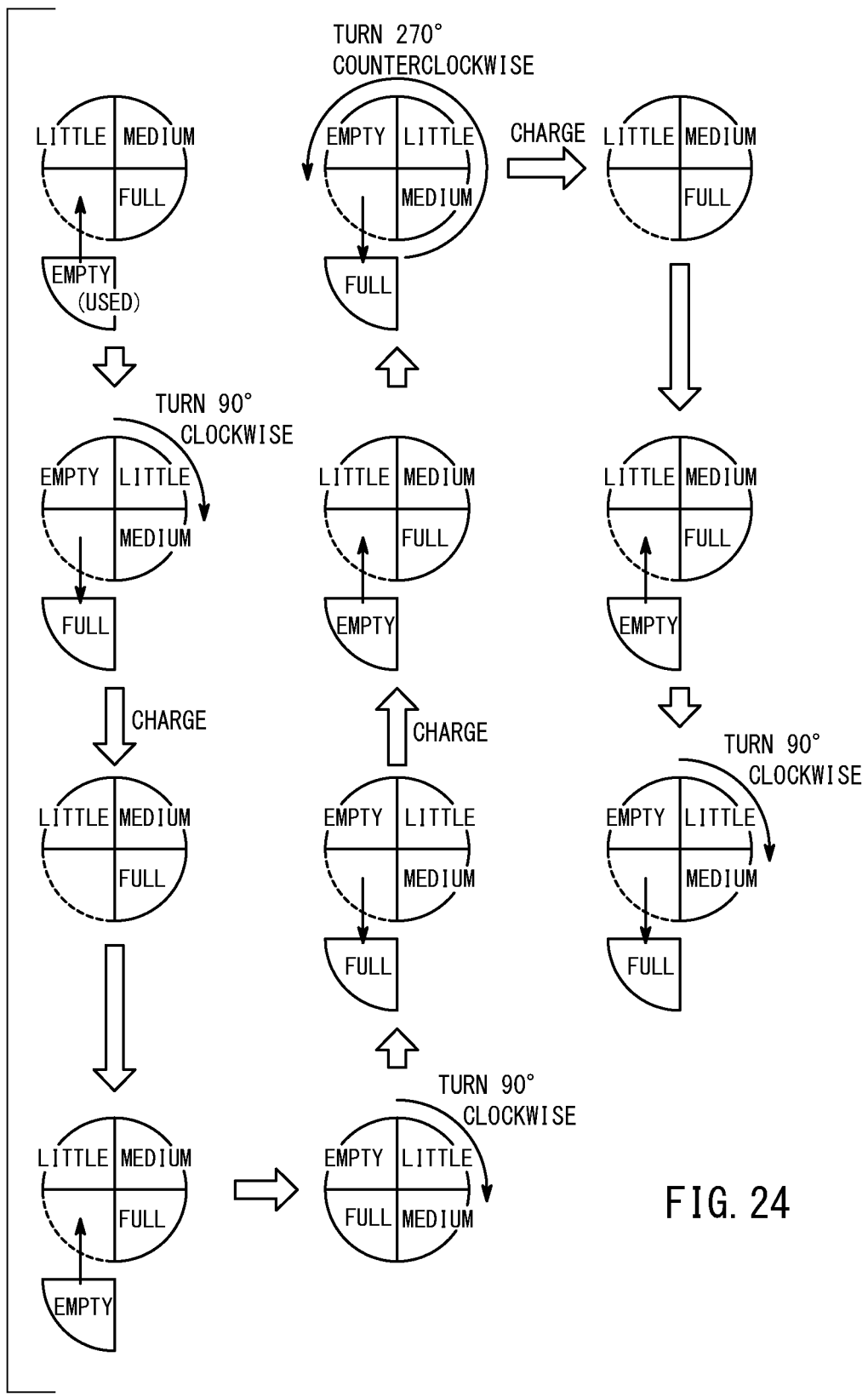
FIG. 24 is a flow illustrating index rotation of the lower-stage rotary table and charging operations of batteries.

Next, the control device 60 energizes the lower-stage driving motor 56a and upper-stage driving motor 56b. The timing belts 616 thus circle to turn the lower-stage rotary table 54a and upper-stage rotary table 54b. This turning operation is illustrated in the flow of FIG. 24 in an example of the first unit magazine 32a. Note that in FIG. 24 "empty", "little", "medium", and "full" respectively indicate battery 10 that cannot further discharge and requires recharging, battery 10 being recharged in which charging has started and discharging capacity is recovering, battery 10 being recharged in which charging has progressed and discharging capacity has considerably recovered, and battery 10 fully recharged in which discharging capacity has recovered. That is, "empty" does not mean absence of battery 10.

When a charge-requiring battery 10 ("empty") is inserted into the casing 34 from the first storage position 36a as described above, the lower-stage rotary table 54a makes an index rotation clockwise (to the right) by 90°. The charging section 90 including the rotary disk 92 also makes an index rotation integrally and thus a fully recharged battery 10 is moved to the first storage position 36a.

After the index rotation, the phase of the lower-stage rotary table 54a is judged by the interlock switch 612 (see FIGS. 17 and 18) that senses the position of the latch grooves 620. After the lower-stage rotary table 54a has been judged to have index-rotated by 90°, the extending and retracting rod 602 of the phase retaining cylinder 600 moves forward and enters a fitting recess 604. This entry (fitting) hinders rotation of the lower-stage rotary table 54a.

During index rotation of the lower-stage rotary table 54a, the second cam followers 608 prevent unsteadiness of the lower-stage rotary table 54a and the third cam followers 610 retain the position of the rotating center.

It is a matter of course that the upper-stage rotary table 54b of the second unit magazine 32b operates in the same way.

The control device 60 recognizes that the lower-stage rotary table 54a has made an index rotation by 90°, and then the control device 60 energizes, with a command signal, only the raising and lowering motor 502 (see FIGS. 9 and 13) that is provided on the support board 200 of the charging stand 100 that is located in the first storage position 36a, or the second storage position 36b, to which the fully recharged battery 10 has been transferred. That is, the remaining three raising and lowering motors 502 are not energized at the same time as this energizing operation.

As the raising and lowering motor 502 is energized, the worm 504 rotates in the opposite direction to the direction explained earlier. Following this rotation, the worm gear 506, transmission shaft 512, and rack-side gear 508 rotate, so as to displace the rack slide 404 closer to the device-side charging connector 112. That is, it is moved back in the A2 direction.

As the rack slide 404 moves backward, the first shaft 514 integrally moves backward in the A2 direction. Then, the top ends of the arm members 518 are pulled backward (in the A2 direction) so that the lower ends of the arm members 518 descend. That is, the arm members 518 turn to change from the posture shown in FIG. 15 to the posture shown in FIG. 14. Following this motion, the device-side charging connector 112 descends to separate away from the battery-side charging and discharging connector 22 to be positioned below the lower-stage rotary table 54a through the connector hole 110 of the charging tray 104. During the descending, the device-side charging connector 112 is guided by the guide rods 526.

As the rack slide 404 thus moves back toward the device-side charging connector 112, the first cam portion 412 of the claw-shaped member 406 moving integrally with the device-side charging connector 112 presses the second cam portion 424 of the cam member 408. Thus pressed, the cam member 408 is displaced along the cam guide rails 420 in the direction separating away from the rack guide rails 402.

Accordingly, the link member 430 changes its posture in the direction away from the hook member 432 and then the second protrusion 446 moves past the first protrusion 442 to be located frontward of the first protrusion 442 (on the A1 side). Then, the link member 430 pulls the hook member 432 through the second return spring 452.

The hook member 432 pivots on the third pivot shaft 444 and the hook portion 450 separates away from the link member 430 (see FIG. 12). That is, the hook portion 450 opens.

As a result, as shown in FIG. 10, the leg 312 is released from the hook portion 450. Then, the tray discharge springs 310 contract and the contracted tray discharge springs 310 pull the charging tray 104 frontward.

Figure 25:
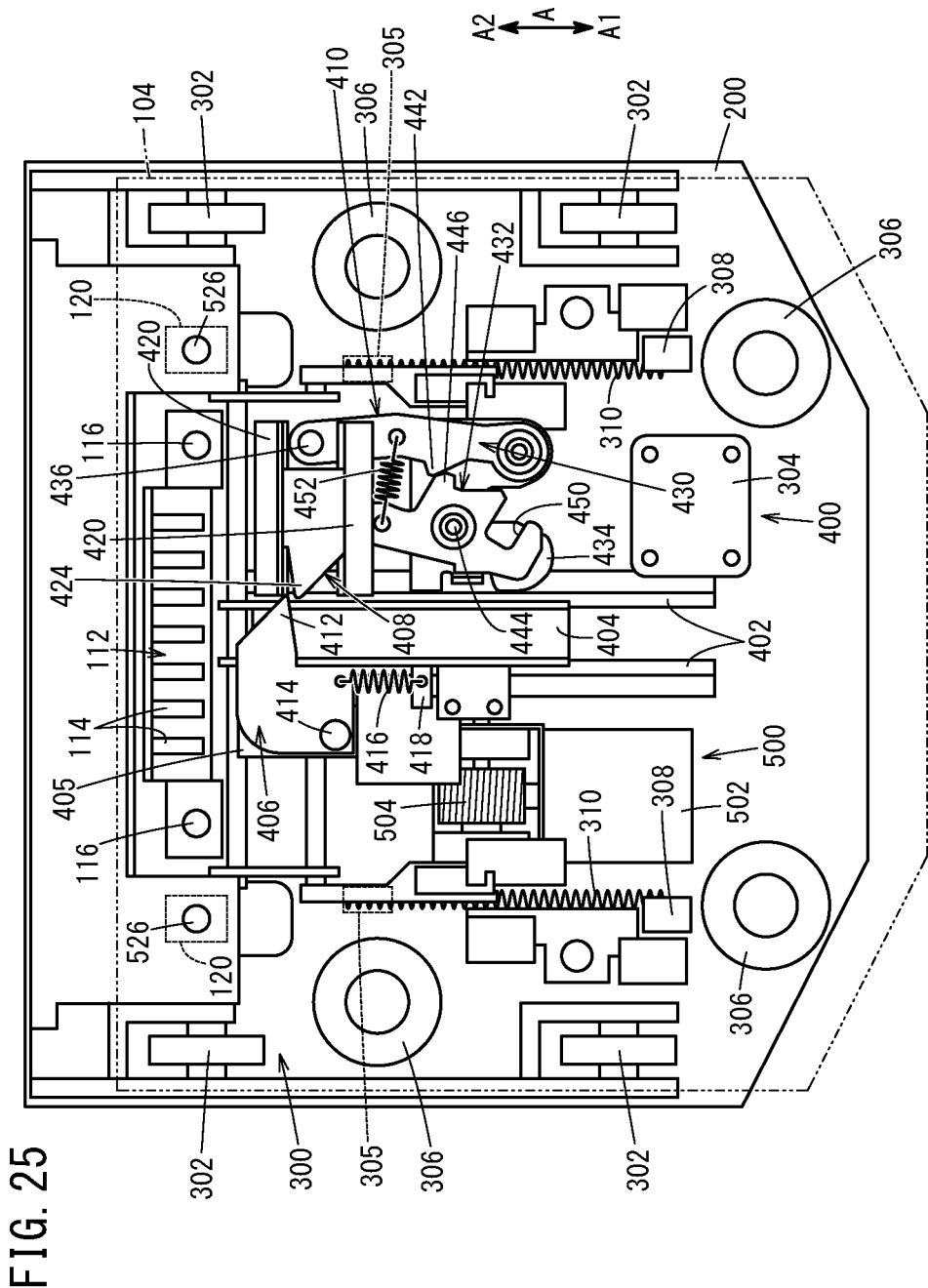
FIG. 25 is a schematic plan view showing the condition where the rack slide of the sliding mechanism has moved backward and the lock mechanism has released the charging tray.

Consequently, the charging tray 104 slides together with the attaching plates 305 in the direction opposite to the device-side charging connector 112, i.e. frontward or in the A1 direction. FIG. 25 shows the sliding mechanism 300 and the lock mechanism 400, together with the support board 200, with the charging tray 104 having moved frontward.

In this way, the charging tray 104 is returned to the advanced position in the first storage position 36a. At this time, the recharged battery 10 also integrally advances to separate away from the backboard 102. The entry opening 20 of the battery 10 thus separates away from the judging projection 108 of the backboard 102.

In this embodiment, after the proximity sensor 106 has sensed that the recharged battery 10 has left away from the backboard 102, the control device 60 sends a command signal to the shutter opening and closing motor 702. As a result, the small pulley 724 rotates to circle the opening and closing belt 726, turning the large pulley 722 to open the first opening and closing shutter 38a, second opening and closing shutter 38b. After that, the user can take the fully recharged battery 10 moved to the first storage position 36a, second storage position 36b, out of the casing 34 and set it into the electric motorbike EB.

As shown in FIG. 8, the holding bars 16 of adjacent batteries 10 extend in directions substantially orthogonal to each other. Accordingly, the direction in which the holding bar 16 extends when the user takes out a fully recharged battery 10 corresponds to the direction in which the holding bar 16 extends when the user inserts a charge-requiring battery 10. The battery 10 can thus be extracted easily.

As explained earlier, the first opening and closing shutter 38a and the second opening and closing shutter 38b are opened after the charging trays 104 and batteries 10 have been transferred to the first storage position 36a and the second storage position 36b. This prevents, for example, the user from putting his or her hand into the casing 34 while the charging sections 90 are performing index rotation.

After the recharged batteries 10 have been taken out, the control device 60 sends a command signal to the shutter opening and closing motors 702 so as to bring the first opening and closing shutter 38a and the second opening and closing shutter 38b into a closed state. This prevents the user's hand from hitting the shutter body 700 while taking out the battery 10. This also prevents the user from putting his or her hand, for example, into the casing 34 after taking out the battery 10.

Recharged batteries 10 are taken out in this way and then no battery 10 is present in the first storage position 36a and the second storage position 36b. In this state, electric power is supplied from the lower-stage chargers 52a, upper-stage chargers 52b to the device-side charging connectors 112 through the power-supply cables 800. Thus, charging operations to the three batteries 10 (six batteries 10 in total) remaining in the first unit magazine 32a and second unit magazine 32b progress, and the charge-requiring batteries 10 change from "empty" to "little". In the same way, "little" batteries 10 change to "medium", and "medium" batteries 10 change to "full". Batteries 10 are still absent in the first storage position 36a and the second storage position 36b.

In the same way, a second user stores charge-requiring batteries 10 into the casing 34 from the first storage position 36a and the second storage position 36b. In this case, too, the lower-stage rotary table 54a and the upper-stage rotary table 54b make a clockwise (right) index rotation by 90°. The lower-stage rotary table 54a and the upper-stage rotary table 54b have thus index-rotated by 180° from the initial position.

After the fully recharged batteries 10 ("full") reaching the first storage position 36a and the second storage position 36b have been taken out, the batteries 10 are charged in this state, i.e., without any batteries 10 in the first storage position 36a and the second storage position 36b as explained above. As a result, "empty", "little" and "medium" become "little", "medium" and "full".

In the same way, a third user stores charge-requiring batteries 10 into the casing 34 from the first storage position 36a and the second storage position 36b. In this case, the lower-stage rotary table 54a and the upper-stage rotary table 54b make a counterclockwise (left) index rotation by 270°. Hence, the index rotation of the lower-stage rotary table 54a and the upper-stage rotary table 54b from their initial positions is −90°.

After the fully recharged batteries 10 ("full") reaching the first storage position 36a and the second storage position 36b have been taken out, the batteries 10 are charged in the charging sections 90 in the positions other than the first storage position 36a and the second storage position 36b in this state, i.e., without any batteries 10 in the first storage position 36a and the second storage position 36b as explained above. As a result, "empty", "little" and "medium" become "little", "medium" and "full".

In the same way, a fourth user stores charge-requiring batteries 10 into the casing 34 from the first storage position 36a and the second storage position 36b. In this case, the lower-stage rotary table 54a and the upper-stage rotary table 54b make a clockwise (right) index rotation by 90°. Hence, the index rotation of the lower-stage rotary table 54a and upper-stage rotary table 54b from their initial positions is 0°.

After the fully recharged batteries 10 ("full") reaching the first storage position 36a and the second storage position 36b have been taken out, the batteries 10 are charged in this state, i.e., without any batteries 10 in the first storage position 36a and the second storage position 36b as explained above. As a result, "empty", "little" and "medium" become "little", "medium" and "full".

With a fifth user and after that, index rotation is repeated as described above. In this way, according to this embodiment, the lower-stage rotary table 54a and the upper-stage rotary table 54b turn not only in one of clockwise and counterclockwise directions, but they make index rotation in one direction to a given index angle and then turn oppositely to a given index angle in the remaining one direction. Accordingly, the power-supply cables 800 (see FIGS. 6, 7 and 19) are only twisted and untwisted within a given rotation angle. That is, a twist in the same direction is not continued and so damage to the power-supply cables 800 is effectively avoided.

Furthermore, the power-supply cables 800 are electrically connected to the device-side charging connectors 112 through the quadrangular hollow portion 802 formed by combining the backboards 102 together, from a position higher than the upper ends of the batteries 10 placed on the charging stands 100. This ensures a long length of the power-supply cables 800 from the starting point of the twisting to the device-side charging connectors 112. This reduces the degree of twisting of the power-supply cables 800 compared to cases where a short length is provided from the starting point of twisting to the device-side charging connectors 112. This also effectively avoids damage to the power-supply cables 800.

Furthermore, it is possible to continue charging operation while the lower-stage rotary table 54a is turning.

Still further, the user can take out fully recharged batteries 10 easily since the lower-stage rotary table 54a and the upper-stage rotary table 54b perform index rotation in the manner described above.

When a first user has exchanged batteries 10 and then a second user exchanges batteries 10 immediately after that, the receiver continuously receives the signal sent from the transmitters. If the signal is received continuously for a certain time period, the shutter bodies 700 may be kept in an opened state after the first user inserted charge-requiring batteries 10. This allows the second user to quickly exchange charge-requiring batteries 10 with fully recharged batteries 10.

Furthermore, in this embodiment, the magazine-type lower-stage rotary table 54a and upper-stage rotary table 54b (charging stands 100) store multiple batteries 10 while charging them. This makes it possible to fill the demand of multiple users to replace charge-requiring batteries 10.

The present invention is not particularly limited to the embodiment described above, and various modifications are possible without departing from the essence and gist of the present invention.

For example, an increased number of unit magazines may be provided and stacked on one another. Alternatively, a magazine-type charging device may be composed of a single unit magazine.

Further, the lower-stage rotary table 54a may be turned by a plurality of gears (a group of gears). In this case, gears are attached to the motor's rotating shaft and the lower-stage rotary table 54a, in which case the gear attached to the lower-stage rotary table 54a is rotationally driven directly by the gear attached to the motor's rotating shaft, or indirectly by one or more other gears. The same applies also to the upper-stage rotary table 54b.

The opening and closing shutters may also be provided with multiple gears as mentioned above so that the first opening and closing shutter 38a and second opening and closing shutter 38b are opened and closed under the action of the gears.

Further, the control device 60 that constitutes extraction detecting means for detecting extraction of batteries 10 may be configured to keep the shutters 38a and 38b open while the presence of a user is being detected even after recharged batteries 10 have been extracted from the charging stands 100.

REFERENCE SIGNS LIST 10 battery
12 arch portion
14 tab-like projection
16 holding bar
18 holding clearance
20 entry opening
22 battery-side charging and discharging connector
30 magazine-type charging device
32a, 32b unit magazine
34 casing
36a, 36b storage position
38a, 38b opening and closing shutter
50a to 50c base plate
52a, 52b charger
54a, 54b rotary table
56a, 56b driving motor
60 control device
90 charging section
100 charging stand
102 backboard
104 charging tray
106 proximity sensor
108 judging projection
110 connector hole
112 device-side charging connector
120 guided portion
200 support board
300 sliding mechanism
302 retractable roller
304 moved plate
305 attaching plate
306 impact-absorbing spring
310 tray discharge spring
312 leg
400 lock mechanism
402 rack guide rail
404 rack slide
405 displaceable plate
406 claw-shaped member
408 cam member
410 snatch lock
412, 424 cam portion
414, 440, 444 pivot shaft
416, 452 return spring
418 spring attaching portion
420 cam guide rail
430 link member
432 hook member
434 backup plate
442, 446 protrusion
450 hook portion
500 raising and lowering mechanism
502 raising and lowering motor
504 worm
506 worm gear
508 rack-side gear
510 link assembly
512 transmission shaft
518 arm member
600 phase retaining cylinder
602 extending and retracting rod
604 fitting recess
606 first cam follower
608 second cam follower
610 third cam follower
612 interlock switch
613 disk-shaped body
614 ring body
616 timing belt
620 latch groove
622 bearing
624 bearing holder
700 shutter body
702 shutter opening and closing motor
704 first portion
706 second portion
708 third portion
710 driving force transmitting portion
716 fourth portion
718 fifth portion
720 sixth portion
722 large pulley
724 small pulley
726 opening and closing belt
728 torque limiter
800 power-supply cable
802 hollow portion
804 binding band
EB electric motorbike

The invention claimed is:

1. A magazine-type charging device which allows a battery that requires charging to be stored in a storage position and a recharged battery to be moved to the storage position and extracted from the storage position, the magazine-type charging device comprising:
a rotary table;
a driving device for turning the rotary table;
a charging stand that is provided on the rotary table and on which the battery is placed; and
a device-side charging connector that is provided in the charging stand and with which a battery-side charging connector of the battery is engaged,
the charging stand comprising:
a charging tray having formed therein a connector hole through which the device-side charging connector is passed; and
a raising and lowering mechanism for displacing the device-side charging connector in a vertical direction,
wherein the raising and lowering mechanism is configured to raise the device-side charging connector so as to pass the device-side charging connector through the connector hole in a case where a position of the connector hole coincides with a position of the device-side charging connector.

2. The magazine-type charging device according to claim 1, wherein the charging stand includes a sliding mechanism for sliding the charging tray frontward and backward and a lock mechanism for positioning and fixing the charging tray, and
the lock mechanism is configured to position and fix the charging tray in a case where the charging tray slides and a position of the connector hole coincides with a position of the device-side charging connector and to release the positioning and fixing of the charging tray as the device-side charging connector is lowered.

3. The magazine-type charging device according to claim 2, wherein the charging stand includes an elastic member for sliding the charging tray frontward when the positioning and fixing is released.

4. The magazine-type charging device according to claim 1, wherein the charging stand includes a sliding mechanism for displacing the charging tray frontward and backward.

5. The magazine-type charging device according to claim 4, wherein the sliding mechanism includes a retractable roller that contacts a bottom surface of the charging tray from under.

6. The magazine-type charging device according to claim 4, wherein the charging stand includes a backboard extending along one side surface of the battery, and
the backboard is provided with a judging projection and the battery includes an entry opening that is disposed at a position higher than a top surface of the battery and into which the judging projection enters.

7. The magazine-type charging device according to claim 6, wherein the battery further includes:
a handle that is separated from the top surface of the battery and disposed in substantially a center of the top surface to extend linearly; and
an entry opening forming portion that is provided at one end of the handle and extends in a direction substantially orthogonal to a direction in which the handle extends, and in which the entry opening is formed.

8. The magazine-type charging device according to claim 7, wherein the battery further includes a projection that projects from the top surface to connect with another end of the handle and that has an upper end separated from the top surface at a distance at least larger than a distance from the top surface to a lower end of the entry opening, wherein a portion between the projection and the top surface is closed.

9. The magazine-type charging device according to claim 1, further comprising a casing that accommodates the rotary table, wherein the charging stand is provided as multiple charging stands, and each of the multiple charging stands is provided with the device-side charging connector, and
the multiple charging stands are exposed out of the casing only in the storage position.

10. The magazine-type charging device according to claim 1, wherein the rotary table, the driving device, the charging stands, and the device-side charging connectors constitute a unit magazine, and the magazine-type charging device comprises a plurality of the unit magazines that are stacked one on top of another.

11. The magazine-type charging device according to claim 10, wherein the unit magazine located below and the unit magazine located above are laid out in an offset arrangement.

12. The magazine-type charging device according to claim 1, comprising an opening and closing shutter in the storage position to cover the charging stand and the battery.

13. The magazine-type charging device according to claim 11, wherein the driving device includes a driving motor and a rotational force transmitting system, and
the driving motor is disposed in a space produced by the offset arrangement between the rotary tables.

14. The magazine-type charging device according to claim 13, comprising a plurality of chargers for charging the battery, wherein at least one of the plurality of chargers is disposed in the space.

15. The magazine-type charging device according to claim 12, further comprising a user detecting unit, wherein the opening and closing shutter is biased when detection of presence of a user has been maintained for a preset given time after the detection of the presence of the user was started by the user detecting unit.

16. The magazine-type charging device according to claim 15, wherein the user detecting unit is a wireless communication unit that is capable of performing wireless communications with the user, and the opening and closing shutter is brought from a closed state to an opened state in a case where the wireless communications with the user have been maintained for the given time.

17. The magazine-type charging device according to claim 15, comprising a placement detecting unit configured to detect that a battery requiring charging has been placed on the charging stand located in the storage position,
wherein the opening and closing shutter is closed after the placement detecting unit detected that the charge-requiring battery was placed on the charging stand.

18. The magazine-type charging device according to claim 15, comprising an extraction detecting unit configured to detect that a recharged battery has been extracted from the charging stand located in the storage position,
wherein the opening and closing shutter is closed after the extraction detecting unit detected that the recharged battery was extracted from the charging stand.

19. The magazine-type charging device according to claim 18, wherein the opening and closing shutter is maintained in an opened state while the presence of the user is still being detected by the user detecting unit even after the extraction detecting unit detected that the recharged battery has been extracted from the charging stand.

* * * * *